United States Patent
Wang et al.

(10) Patent No.: US 12,430,894 B2
(45) Date of Patent: Sep. 30, 2025

(54) IMAGE PROCESSING APPARATUS AND IMAGE PROCESSING METHOD

(71) Applicant: Kioxia Corporation, Tokyo (JP)

(72) Inventors: Bo Wang, Yokohama Kanagawa (JP); Youyang Ng, Yokohama Kanagawa (JP); Yuchieh Lin, Yokohama Kanagawa (JP); Kengo Nakata, Kawasaki Kanagawa (JP); Takeshi Fujiwara, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 190 days.

(21) Appl. No.: 17/942,815

(22) Filed: Sep. 12, 2022

(65) Prior Publication Data

US 2023/0290125 A1 Sep. 14, 2023

(30) Foreign Application Priority Data

Mar. 11, 2022 (JP) .................. 2022-038361

(51) Int. Cl.
*G06V 10/774* (2022.01)
*G06V 10/40* (2022.01)
(Continued)

(52) U.S. Cl.
CPC .......... *G06V 10/7747* (2022.01); *G06V 10/40* (2022.01); *G06V 10/764* (2022.01);
(Continued)

(58) Field of Classification Search
CPC .. G06V 10/7747; G06V 10/40; G06V 10/764; G06V 10/776; G06V 10/82; G06V 20/70; G06V 10/774; G06V 10/454
See application file for complete search history.

(56) References Cited

U.S. PATENT DOCUMENTS 9,710,729 B2 7/2017 Chidlovskii et al.
10,769,497 B2 9/2020 Haneda et al.
(Continued)

FOREIGN PATENT DOCUMENTS

JP 3639520 B2 4/2005
JP 2016-058079 A 4/2016
(Continued)

OTHER PUBLICATIONS

Ganin et al., "Domain-Adversarial Training of Neural Networks", Journal of Machine Learning Research, May 26, 2016, 35 pages.

*Primary Examiner* — Christopher Wait
(74) *Attorney, Agent, or Firm* — Maier & Maier, PLLC

(57) ABSTRACT

An image processing apparatus has a first image acquisitor that acquires a source image, a second image acquisitor that acquires a first target image, a label acquisitor that acquires a label, a feature extractor including a first neural network that extracts a feature of the source image and a feature of the first target image, a class classifier including a second neural network that performs a class classification of the source image and the first target image, a domain classifier including a third neural network that performs a domain classification of the source image and the first target image, a processor that assigns a pseudo label to the first target image, a self-learner that performs a self-learning of the first neural network, the second neural network, and the third neural network, and a learner that learns the first, second and third neural networks, by performing a back propagation process.

20 Claims, 35 Drawing Sheets

(51) Int. Cl.
*G06V 10/764* (2022.01)
*G06V 10/776* (2022.01)
*G06V 10/82* (2022.01)
*G06V 20/70* (2022.01)

(52) U.S. Cl.
CPC ............ *G06V 10/776* (2022.01); *G06V 10/82* (2022.01); *G06V 20/70* (2022.01)

(56) References Cited

U.S. PATENT DOCUMENTS

| | | | |
|---|---|---|---|
| 2016/0070986 A1* | 3/2016 | Chidlovskii | G06V 20/54 382/104 |
| 2020/0410388 A1 | 12/2020 | Liu et al. | |
| 2021/0334938 A1 | 10/2021 | Maeda | |

FOREIGN PATENT DOCUMENTS

| | | | |
|---|---|---|---|
| JP | 6431231 B1 | 11/2018 | |
| JP | 6737997 B1 | 8/2020 | |
| JP | 2021144703 A | 9/2021 | |

\* cited by examiner

IMAGE PROCESSING APPARATUS AND IMAGE PROCESSING METHOD

CROSS REFERENCE TO RELATED APPLICATIONS

This application is based upon and claims the benefit of priority from the prior Japanese Patent Application No. 2022-038361, filed on Mar. 11, 2022, the entire contents of which are incorporated herein by reference.

FIELD

An embodiment of the present disclosure relates to an image processing apparatus and an image processing method.

BACKGROUND

A technique for classifying images using machine learning has attracted attention. For example, a method of classifying images into several classes and assigning labels associated with the classes to the images has been proposed. In this method, class classification and labeling are performed using a learnable neural network.

However, in order to perform appropriate class classification and labeling, it is necessary to sufficiently learn the neural network. Sufficient learning requires a lot of teacher data, and therefore requires a lot of costs (time, data, etc.) for learning.

In addition, depending on the image, there may be a case where appropriate class classification and labeling cannot be performed even when learning is performed.

DETAILED DESCRIPTION

According to one embodiment, an image processing apparatus has:
- a first image acquisitor configured to acquire a source image to which a label is assigned;
- a second image acquisitor configured to acquire a first target image to which no label is assigned;
- a label acquisitor configured to acquire a label;
- a feature extractor including a first neural network configured to extract a feature of the source image and a feature of the first target image;
- a class classifier including a second neural network configured to perform a class classification of the source image and the first target image based on a plurality of the features extracted by the feature extractor;
- a domain classifier including a third neural network configured to perform a domain classification of the source image and the first target image based on the feature extracted by the feature extractor;
- a processor configured to assign a pseudo label to the first target image using the class classifier including the second neural network in a middle of learning;
- a self-learner configured to perform a self-learning of the first neural network, the second neural network, and the third neural network based on a feature obtained by inputting the first target image to which the pseudo label is assigned to the feature extractor; and
- a learner configured to learn the first neural network, the second neural network, and the third neural network by performing a back propagation process based on a classification result by the class classifier, a classification result by the domain classifier, and a self-learning result by the self-learner.

Hereinafter, embodiments of an image processing apparatus and an image processing method will be described with reference to the drawings. Although main components of the image processing apparatus will be mainly described below, the image processing apparatus may have components and functions that are not illustrated or described. The following description does not exclude components and functions that are not illustrated or described.

First Embodiment

Figure 1:
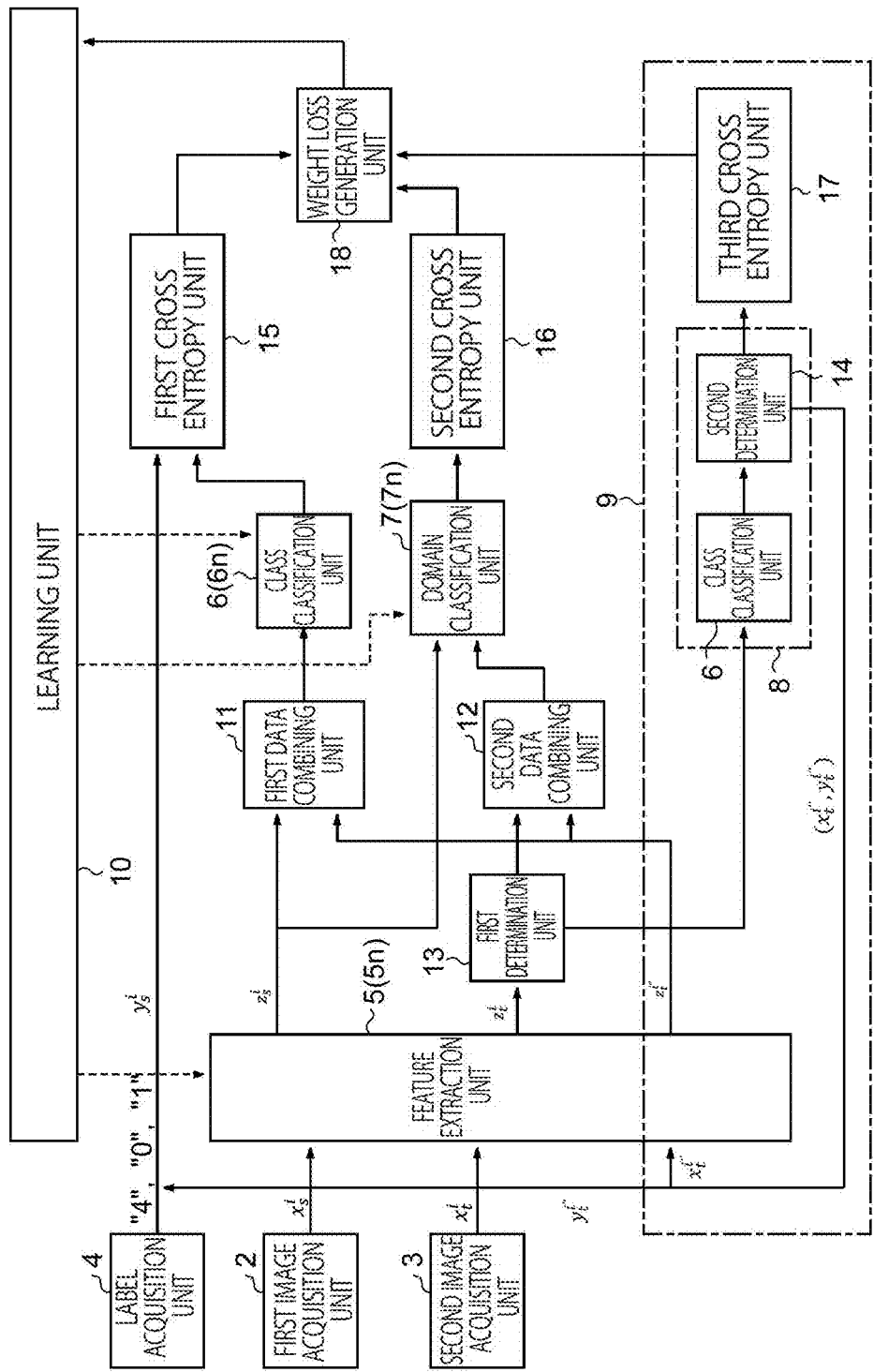
FIG. 1 is a block diagram illustrating a schematic configuration of an image processing apparatus according to a first embodiment.
Figure 2:
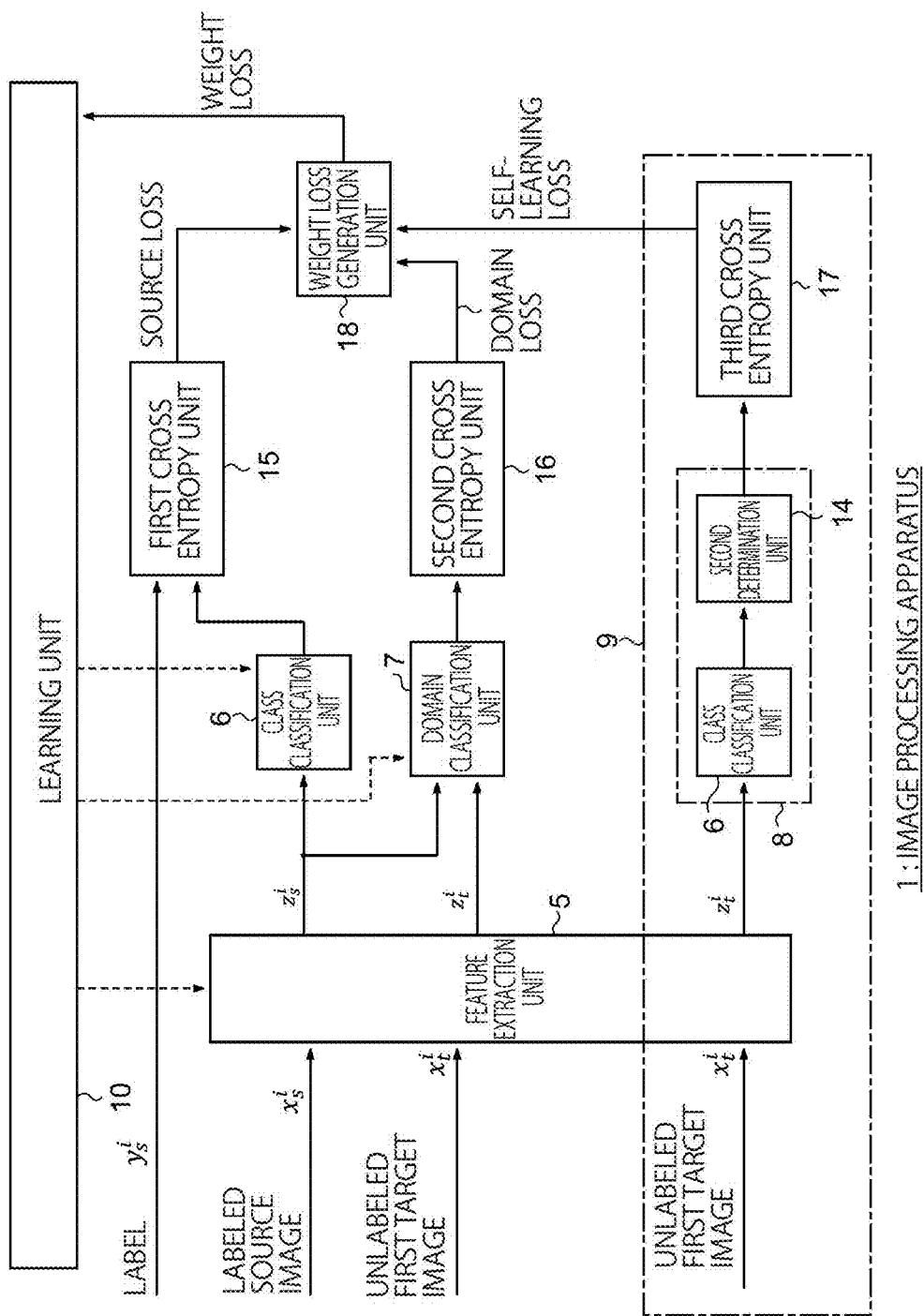
FIG. 2 is a block diagram of a main part of the image processing apparatus according to the first embodiment.

FIG. 1 is a block diagram illustrating a schematic configuration of an image processing apparatus 1 according to a first embodiment, and FIG. 2 is a block diagram of a main part of the image processing apparatus 1 according to the first embodiment in FIG. 1. A processing operation of the image processing apparatus 1 in FIG. 1 can be realized, for example, by a computer executing a program stored in a recording medium. Alternatively, a hardware device that executes the processing operation of the image processing apparatus 1 of FIG. 1 may be provided.

As illustrated in FIGS. 1 and 2, the image processing apparatus 1 according to the first embodiment includes a first image acquisition unit 2, a second image acquisition unit 3, a label acquisition unit 4, a feature extraction unit 5, a class classification unit 6, a domain classification unit 7, a self-learning unit 9 including a processing unit 8, a learning unit 10, a first data combining unit 11, a second data combining unit 12, a first determination unit 13, a second determination unit 14, a first cross entropy unit 15, a second cross entropy unit 16, a third cross entropy unit 17, and a weight loss generation unit 18. In FIGS. 1 and 2, the first data combining unit 11, the second data combining unit 12, the first determination unit 13, the second determination unit 14, the first cross entropy unit 15, the second cross entropy unit 16, the third cross entropy unit 17, and the weight loss generation unit 18 can be appropriately omitted.

The first image acquisition unit 2 acquires source data to which a label is assigned. In the present embodiment, since it is assumed that an image is analyzed, the source data is referred to as a source image $x_s^i$. i is an identifier of an individual source image, and s is an identifier representing the source image.

The label is identification information of each class when the source images are classified into classes. The class is information indicating the type of image. For example, when there is a plurality of types of images such as numbers, animals, or plants, an image is classified into each class of numbers, animals, or plants. A regular label is assigned to the source image, and the source image is used as teacher data.

The second image acquisition unit 3 acquires first target data to which no label is assigned. Since the first target data is image data, the first target data is hereinafter referred to as a first target image $x_t^i$. i is an identifier of an individual first target image, and t is an identifier representing the first target image.

As will be described later, a pseudo label is assigned to the first target image by inference processing by the image processing apparatus 1 of FIG. 1. The pseudo label is a label that is assigned in a pseudo manner by extracting a feature of the first target image and performing inference processing based on the feature.

The label acquisition unit 4 acquires a label $y_s^i$ of the source image acquired by the first image acquisition unit 2. i is an identifier of an individual label, and s is an identifier representing a label of a source image. The example of FIG. 1 illustrates an example of acquiring three labels "4", "0", and "1" for identifying a numeric source image.

The feature extraction unit 5 includes a first neural network 5n that extracts a feature $z_s^i$ of the source image $x_s^i$ from the first image acquisition unit 2 and a feature $z_t^i$ of the first target image $x_t^i$ from the second image acquisition unit 3.

The first neural network 5n has a plurality of layers, and can extract a feature of each of the source image and the first target image by updating parameters such as weights of nodes of the respective layers by learning processing. The source image and the first target image are input to the feature extraction unit 5. In addition, a first target image to which a pseudo label predicted by the class classification unit 6 to be described later is assigned is also input to the feature extraction unit 5.

The class classification unit 6 includes a second neural network 6n that performs class classification of the source image and the first target image based on the features extracted by the feature extraction unit 5.

The domain classification unit 7 includes a third neural network 7n that performs domain classification of the source image and the first target image based on the features extracted by the feature extraction unit 5. The domain refers to a use environment of an image. For example, the domain classification unit 7 classifies the images into different domains depending on whether the background of the image is color or monochrome.

The processing unit 8 assigns a pseudo label to the first target image using the class classification unit 6 including the second neural network 6n in the middle of learning and the second determination unit 14. The pseudo label is associated with a class. When the class of the first target image is inferred by the class classification unit 6, the processing unit 8 can assign a pseudo label to the first target image from the inferred class.

The self-learning unit 9 performs self-learning using a feature extraction unit 5, the processing unit 8, and the third cross entropy unit 17. The self-learning unit 9 inputs the first target image to which the pseudo label is assigned by the processing unit 8 to the feature extraction unit 5. The self-learning unit 9 performs self-learning of the first neural network 5n, the second neural network 6n, and the third neural network 7n based on the features obtained as a result. Furthermore, the self-learning unit 9 outputs a self-learning loss from the third cross entropy unit 17.

The first target image $x_t^{i''}$ with the pseudo label $y_t^{i''}$ generated by the self-learning unit 9 is input to the feature extraction unit 5. The pseudo label $y_t^{i''}$ is input to the first cross entropy unit 15 together with the label $y_s^i$ acquired by the label acquisition unit 4.

The class classification unit 6 in the self-learning unit 9 performs class classification using the same second neural network 6n as the class classification unit 6 connected to the first data combining unit 11 and the first cross entropy unit 15. Therefore, in FIG. 1 and FIGS. 2, 18, 22, 24, and 27 to be described later, two class classification units 6 are illustrated for convenience in order to clearly illustrate a processing operation of the self-learning unit 9. However, the input/output data of the second neural network 6n are different between the class classification unit 6 connected between the first data combining unit 11 and the first cross entropy unit 15 and the class classification unit 6 in the self-learning unit 9.

The learning unit 10 learns the first neural network 5n, the second neural network 6n, and the third neural network 7n by performing a back propagation process based on the classification results by the class classification unit 6 and the domain classification unit 7 and the self-learning result by the self-learning unit 9.

The first data combining unit 11 inputs, to the class classification unit 6, data obtained by combining the feature data of the source image and the feature data of the first target image to which the pseudo label is assigned. The second data combining unit 12 inputs, to the domain classification unit 7, data obtained by combining the feature data of the unlabeled first target image and the feature data of the first target image to which the pseudo label is assigned.

The first determination unit 13 determines whether to perform the self-learning by the self-learning unit 9. In a case where the self-learning is not performed, learning by the learning unit 10 using a result of class classification by the class classification unit 6 and a result of domain classification by the domain classification unit 7 is performed.

When the first determination unit 13 determines that the self-learning is performed, the feature of the first target image is sent to the processing unit 8. The class classification unit 6 in the processing unit 8 performs class classification of the first target image based on the feature $z_t^i$ of the first target image, and assigns a pseudo label associated with the classified class.

The second determination unit 14 determines whether the first target image to which the pseudo label is assigned by the class classification unit 6 is used as the teacher data.

When the first target image $x_t^{i''}$ to which the pseudo label $y_t^{i''}$ is assigned is used as the teacher data, the first target image is input to the feature extraction unit 5.

The first cross entropy unit 15 calculates a source loss (first loss) indicating reliability of class classification of the source image by the class classification unit 6. The second cross entropy unit 16 calculates a domain loss (second loss) indicating reliability of the domain classification of the source image and the first target image by the domain classification unit 7. The third cross entropy unit 17 calculates a self-learning loss (third loss) indicating reliability of class classification of the first target image to which the pseudo label is assigned.

The self-learning unit 9 assigns a pseudo label to the unlabeled first target image and calculates a self-learning loss. In addition, the self-learning unit 9 inputs the first target image to which the pseudo label is assigned to the feature extraction unit 5, and learns the first to third neural networks 5n, 6n, and 7n.

The weight loss generation unit 18 generates a weight loss obtained by adjusting weights of a source loss, a domain loss, and a self-learning loss when the back propagation process is performed. The learning unit 10 performs the back propagation process based on the weight loss to learn the first to third neural networks 5n, 6n, and 7n.

Figure 3:
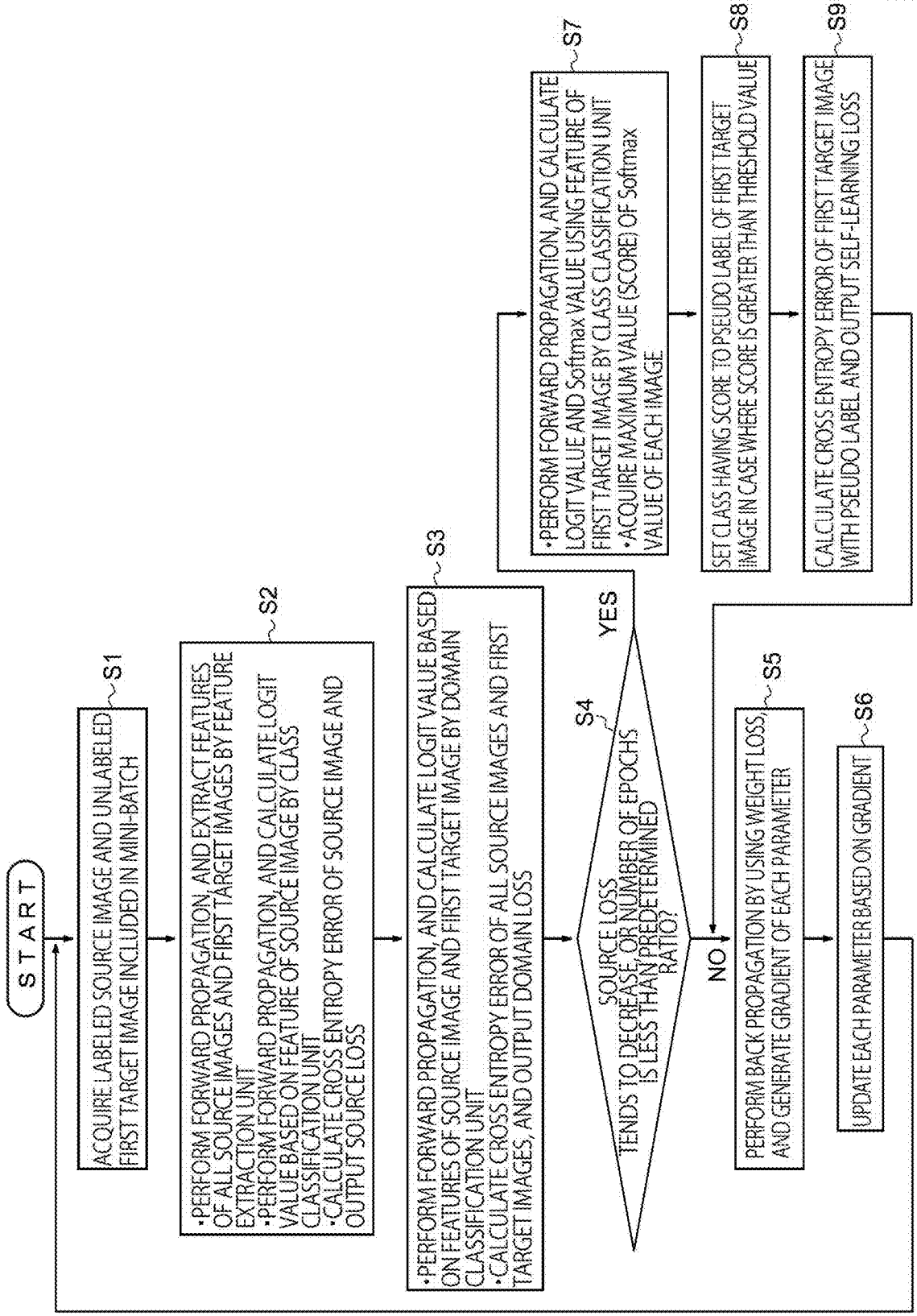
FIG. 3 is a flowchart illustrating a processing operation of the image processing apparatus according to the first embodiment.

FIG. 3 is a flowchart illustrating the processing operation of the image processing apparatus 1 according to the first embodiment. Hereinafter, the processing operation of the image processing apparatus 1 according to the first embodiment will be described with reference to the flowchart of FIG. 3.

The processing of the flowchart of FIG. 3 is performed for each mini-batch including a plurality of source images and a plurality of first target images. In the flowchart of FIG. 3, learning of the first to third neural networks 5n, 6n, and 7n is performed with a mini-batch as a unit.

First, a plurality of labeled source images Xs is acquired, and a plurality of first target images $X_t^u$ are acquired (S1).

Next, by the forward propagation process, the feature extraction unit 5 extracts features of all the source images Xs and the first target images $X_t^u$ included in the mini-batch to be processed.

In addition, the class classification unit 6 calculates a logit value for each class using the feature of the source image Xs extracted by the feature extraction unit 5 to output a Softmax value from the logit value. The Softmax value is a value representing a certainty factor for each class, and is provided for each class. The certainty factor for each class means the degree of possibility with which the image is associated with the class. The first cross entropy unit 15 calculates a cross entropy error of the Softmax value for each class to output a source loss (S2). The source loss is a value obtained by quantifying reliability of class classification by the class classification unit 6. The smaller the source loss, the higher the reliability of class classification.

Before and after the process of S2, by the forward propagation process, the domain classification unit 7 calculates a logit value using the feature of the source image Xs and the feature of the first target image $X_t^u$, and calculates a Softmax value from the logit value. The second cross entropy unit 16 calculates a cross entropy error of the Softmax value for each class for all the source images Xs and the first target images $X_t^u$ to output a domain loss (S3).

The domain loss is a value obtained by quantifying reliability of the domain classification by the domain classification unit 7. The smaller the domain loss, the higher the reliability of the domain classification.

For example, the domain classification unit 7 assigns a label 0 to the source image Xs and a label 1 to the first target image $X_t^u$.

The label assigned by the domain classification unit 7 is referred to as a domain label, and is different from a label associated with a class classified by the class classification unit 6.

Next, it is determined whether the source loss tends to decrease or whether the number of processed epochs is less than a predetermined ratio with respect to the total number of epochs (S4). Here, one epoch refers to a plurality of mini-batches.

When S4 is YES, that is, in a case where the source loss tends to decrease, or in a case where the number of processed epochs is less than a predetermined ratio with respect to the total number of epochs, it is determined that it is too early to perform a self-learning. The learning unit 10 performs the back propagation process using the weight loss generated by the weight loss generation unit 18 (S5). As a result, gradients of the parameters of the first to third neural networks 5n, 6n, and 7n included in the feature extraction unit 5, the class classification unit 6, and the domain classification unit 7, respectively, are generated. Note that the weight loss generated by the weight loss generation unit 18 includes a source loss and a domain loss, and includes a self-learning loss in some cases.

Next, parameters such as weights of the respective layers of the first to third neural networks 5n, 6n, and 7n are updated based on the generated gradients (S6). As a result, learning of the first to third neural networks 5n, 6n, and 7n is performed.

The learning of the first to third neural networks 5n, 6n, and 7n described above is performed for each source image included in the mini-batch.

When NO is determined in S4 during the learning of the first to third neural networks 5n, 6n, and 7n, that is, in a case where the source loss does not tend to decrease, or in a case where the number of processed epochs reaches a predetermined ratio with respect to the total number of epochs, the self-learning unit 9 starts the self-learning.

In the self-learning, the forward propagation process is performed. The class classification unit 6 calculates a logit value for each class using the feature of the first target image $X_t^u$, and calculates a Softmax value from the logit value. Thereafter, the maximum value of the Softmax value for each class of the first target image $X_t^u$ is acquired as a score (S7).

Next, when the acquired score is larger than a threshold value, the processing unit 8 sets the class having the score for the pseudo label of the first target image. That is, the processing unit 8 sets the label of the class having the score as the pseudo label of the first target image $X_t^u$ for the first target image having the score larger than the threshold value (S8).

Next, the processing unit 8 calculates a cross entropy error of the first target image with a pseudo label in the third cross entropy unit 17 to output a self-learning loss (S9). When the process of S9 is completed, the processes of S5 and subsequent processes are performed. The processes of S7 to S9 are performed for each first target image included in the mini-batch.

When the processes of S1 to S9 are completed for all the source images and the first target images included in the mini-batch to be processed, it is considered that one repetition process (iteration) is completed. When one repetition process is completed, the next mini-batch to be processed is processed. The image processing apparatus 1 according to the present embodiment performs a plurality of times of repetition processes for a plurality of mini-batches based on the flowchart of FIG. 3.

As described above, the learning of the first to third neural networks 5n, 6n, and 7n by the learning unit 10 is performed each time the class classification and the domain classification are performed on the respective source images and the respective first target images included in the mini-batch. Similarly, the self-learning by the self-learning unit 9 is also performed each time a pseudo label is assigned to each of the first target images included in the mini-batch.

Figure 4:
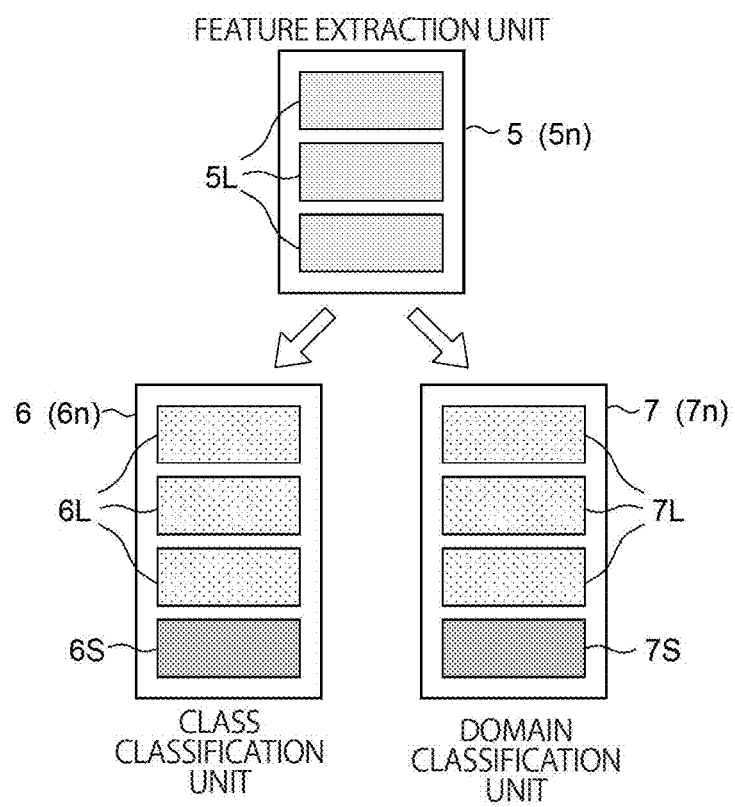
FIG. 4 is a diagram schematically illustrating a layer configuration of each of a first neural network of a feature extraction unit, a second neural network of a class classification unit, and a third neural network of a domain classification unit.

FIG. 4 is a diagram schematically illustrating a layer configuration of each of the first neural network 5n of the feature extraction unit 5, the second neural network 6n of the class classification unit 6, and the third neural network 7n of the domain classification unit 7. As illustrated, each of the first to third neural networks 5n, 6n, and 7n includes a plurality of layers. More specifically, the first neural network 5n includes, for example, a plurality of layers 5L such as a convolution layer, batch normalization (BN), and ReLU, and the number of channels is increased on a layer basis. Since the image has only three channels of RGB, the number of channels is increased to extract more features than three channels. Each of the second neural network 6n and the third neural network 7n includes, for example, a plurality of fully connected layers 6L and 7L, and the number of channels is reduced on a layer basis. In the last stage fully connected layers 6L, 7L, logit values as many as the number of classes are obtained. The layers 6S and 7S connected to the second and third neural networks 6n and 7n, respectively, are layers for each calculating the Softmax value according to the logit value. Softmax values as many as the number of classes are output from the second and third neural networks 6n and 7n. The Softmax value is a value obtained by quantifying the certainty factor corresponding to the associated class.

As described above, in the first embodiment, the self-learning unit 9 is provided, and the first target image to which the pseudo label is assigned by the class classification unit 6 is input to the feature extraction unit 5 to learn the first to third neural networks 5n, 6n, and 7n and calculate the self-learning loss. In addition, the learning unit 10 is provided to perform the back propagation process based on the source loss output from the first cross entropy unit 15, the domain loss output from the second cross entropy unit 16, and the self-learning loss output from the third cross entropy unit 17, thereby learning the first to third neural networks 5n, 6n, and 7n. As a result, an appropriate label can be assigned to the unlabeled first target image. In addition, since the self-learning by the self-learning unit 9 is performed only in a case where it is expected that a valid label can be assigned, processing efficiency can be improved.

First Modification of First Embodiment

In a first modification of the first embodiment, the pseudo label of the first target image assigned in the processing of one mini-batch is not used in another mini-batches.

Figure 5:
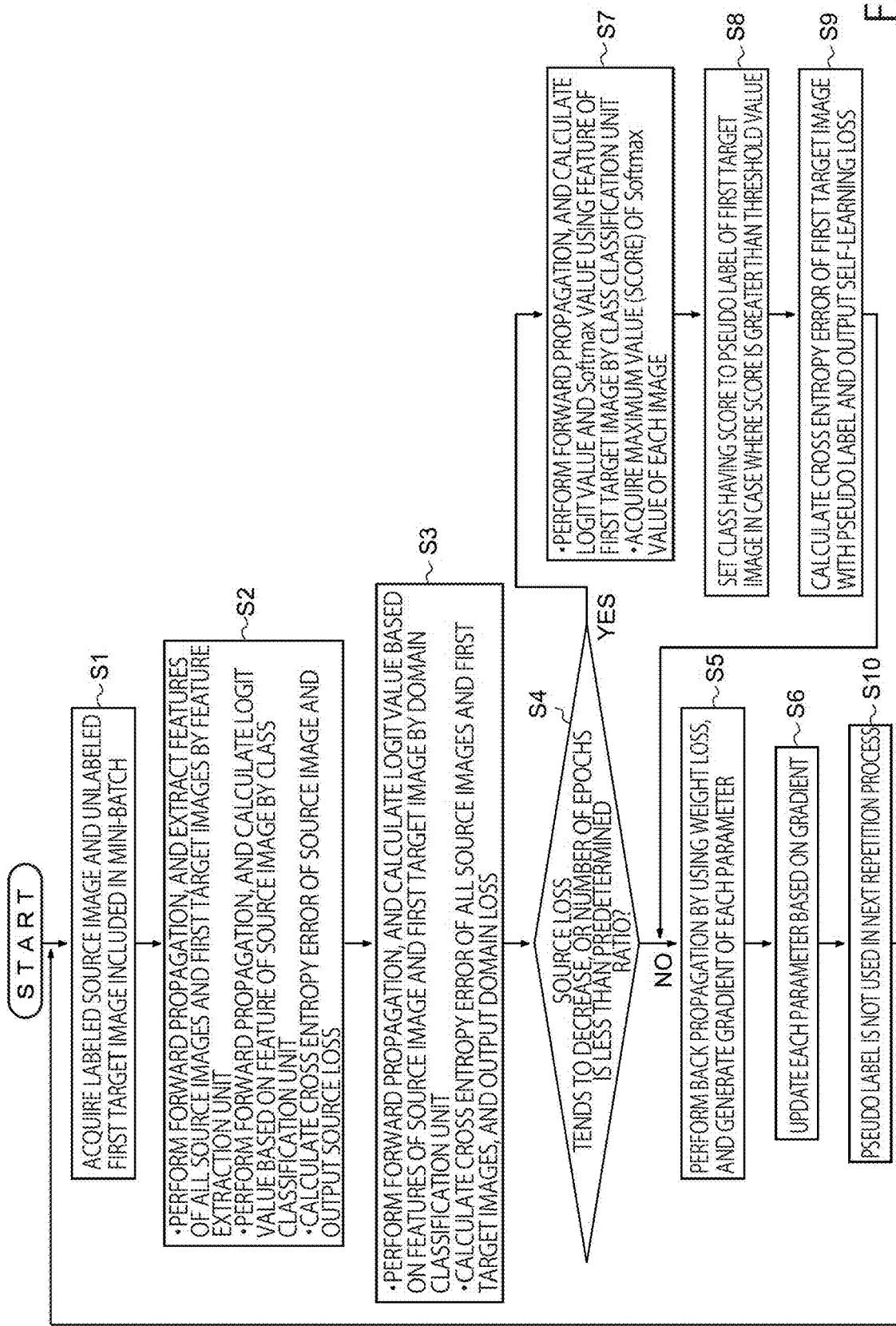
FIG. 5 is a flowchart illustrating a processing operation of an image processing apparatus according to a first modification of the first embodiment.

The block configuration of an image processing apparatus 1 according to the first modification is similar to that in FIGS. 1 and 2. FIG. 5 is a flowchart illustrating a processing operation of the image processing apparatus 1 according to the first modification of the first embodiment. The flowchart of FIG. 5 is obtained by adding S10 to the flowchart of FIG. 3.

When the processes of S1 to S9 are completed for all the source images and the first target images included in a certain mini-batch, one repetition process is completed, but the pseudo label assigned to the first target image in the repetition process is not used in the next repetition process (S10). Thereafter, the process returns to S1 to start the repetition process of the next mini-batch.

The pseudo label assigned to the first target image in the repetition process of a certain mini-batch may not be necessarily appropriate. Learning the first to third neural networks $5n$, $6n$, and $7n$ with the first target image to which an inappropriate pseudo label is assigned may adversely affect the repetition process of another mini-batches. Therefore, in the first modification, the pseudo label assigned to the first target image in the repetition process of a certain mini-batch is not used in the repetition process of another mini-batch. As a result, the adverse effect of the inappropriate pseudo label does not reach the repetition process of all the other mini-batches, and the appropriate pseudo label can be assigned to the first target image.

Second Modification of First Embodiment

A second modification of the first embodiment defines a condition for stopping a self-learning after starting the self-learning.

The block configuration of an image processing apparatus 1 according to the second modification is similar to that in FIGS. 1 and 2. In the image processing apparatus 1 according to the second modification, one condition for performing the self-learning is added. More specifically, in the second modification, even when the self-learning by the self-learning unit 9 is once started, a condition that the self-learning is stopped in a case where the source loss is equal to or more than a threshold value is added. In a case where the source loss is equal to or greater than the threshold value, there is a possibility that an appropriate label cannot be assigned. Therefore, self-learning is stopped, and the learning is continued using the labeled source image.

Figure 6:
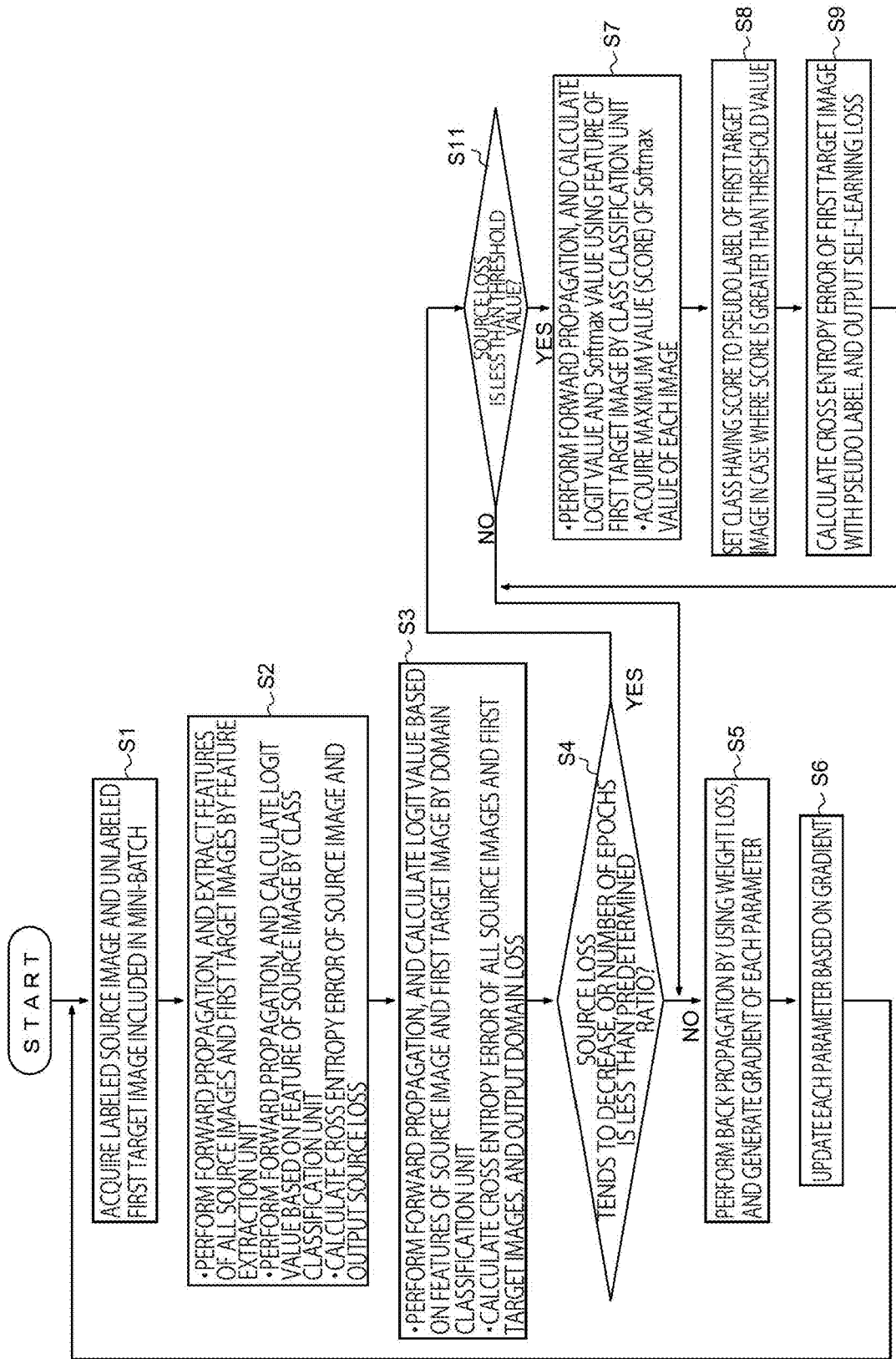
FIG. 6 is a flowchart illustrating a processing operation of an image processing apparatus according to a second modification of the first embodiment.

FIG. 6 is a flowchart illustrating a processing operation of the image processing apparatus 1 according to the second modification of the first embodiment. The flowchart of FIG. 6 is obtained by adding S11 to the flowchart of FIG. 3. S11 is executed after YES is determined in S4. In S11, it is determined whether the source loss output from the second cross entropy unit 16 is smaller than a threshold value. In a case where the source loss is smaller than the threshold value, the self-learning processes of S7 to S9 are continued, but in a case where the source loss is equal to or larger than the threshold value, the self-learning is stopped and the process of S5 is performed. In this case, the processes of S1 to S6 are performed without performing subsequent self-learning.

As described above, in the second modification of the first embodiment, in a case where the self-learning effect cannot be sufficiently obtained, the self-learning is stopped. Therefore, there is no possibility of assigning an inappropriate pseudo label to the first target image by performing the self-learning with low reliability.

Third Modification of First Embodiment

In a third modification of the first embodiment, a calculation result by the class classification unit 6 for the first target image is masked as necessary. Here, masking refers to forcibly making a logit value, which is a calculation result by the class classification unit 6, zero.

Figure 7A:
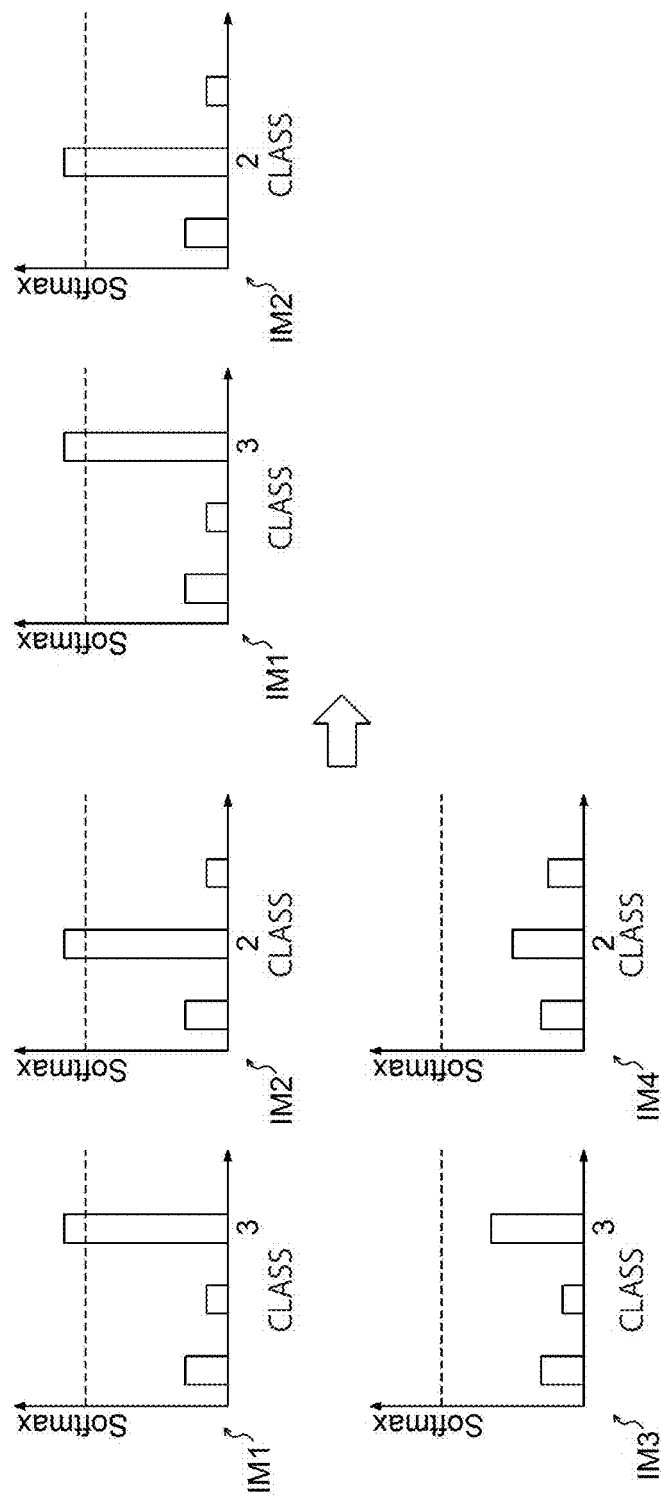
FIG. 7A is a diagram for explaining a basic operation of the image processing apparatus according to the first embodiment.
Figure 7B:
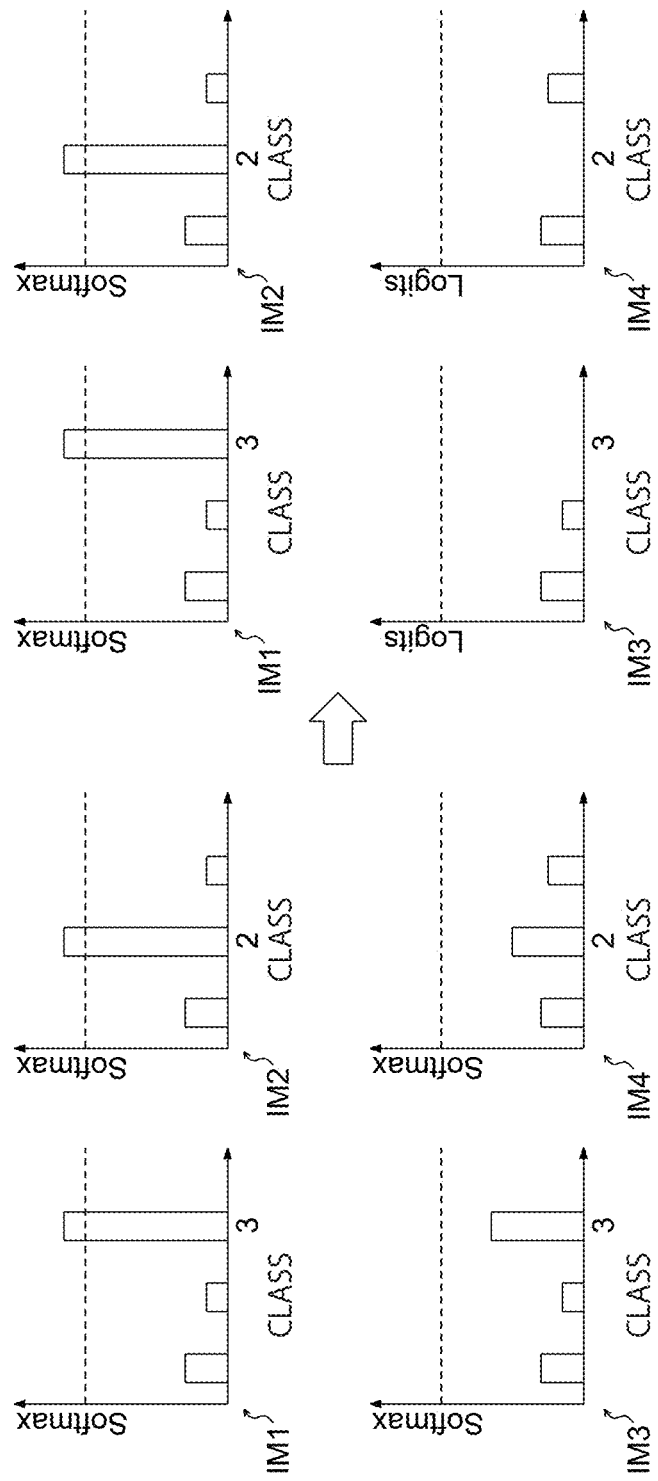
FIG. 7B is a diagram for explaining an operation of maximum logit masking.
Figure 7C:
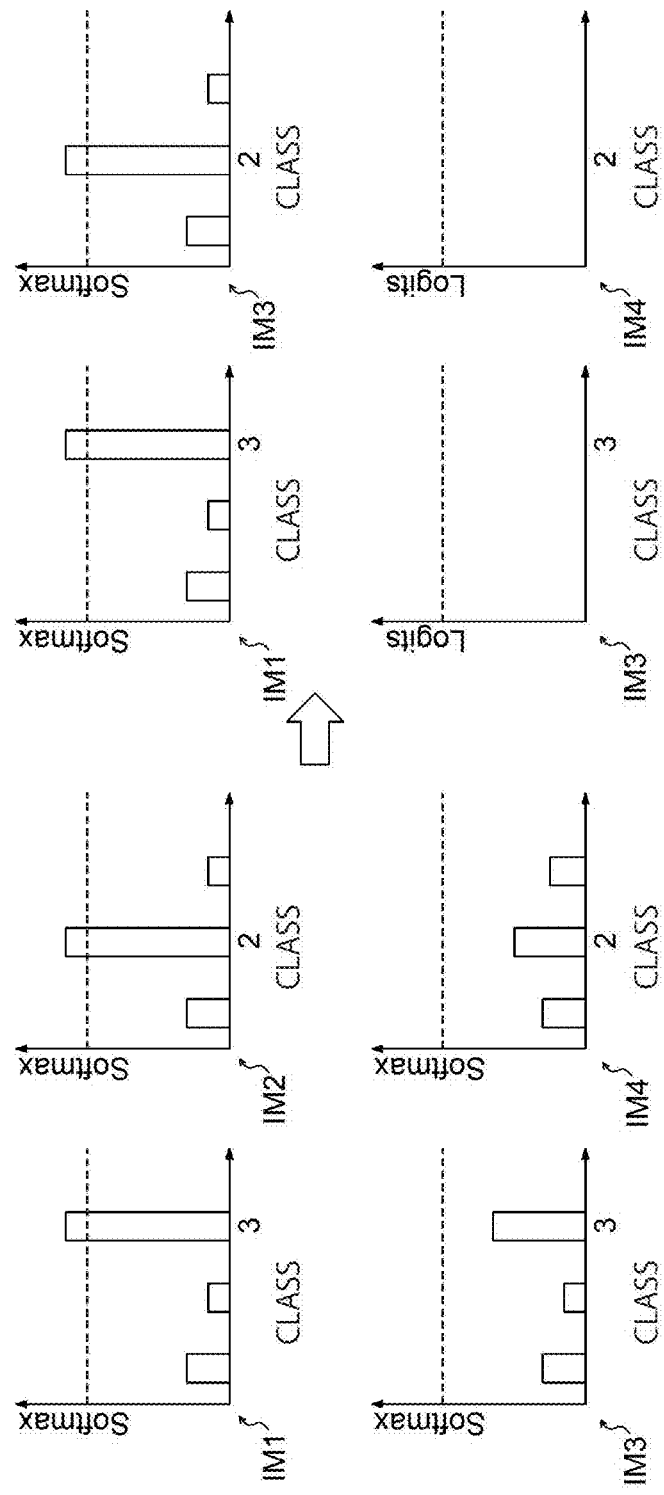
FIG. 7C is a diagram for explaining an operation of full logit masking.

A image processing apparatus 1 according to the third modification of the first embodiment has a block configuration similar to that in FIGS. 1 and 2. FIGS. 7A, 7B, and 7C are diagrams for explaining an operation of the third modification of the first embodiment.

FIG. 7A is a diagram for explaining a basic operation of the image processing apparatus 1 according to the first embodiment. FIG. 7B is a diagram for explaining an operation of a maximum logit masking. FIG. 7C is a diagram for explaining an operation of a full logit masking.

FIGS. 7A, 7B, and 7C are bar graphs showing Softmax values for respective classes of four first target images IM1 to IM4 in a certain mini-batch. An example in which each of the first target images IM1 to IM4 has Softmax values of three classes is illustrated. In FIGS. 7A, 7B, and 7C, the threshold value for the Softmax value illustrated on the vertical axis is indicated by a dotted line. In the examples of FIGS. 7A, 7B, and 7C, in the first target image IM1, the Softmax value of the class 3 exceeds the threshold value. In the first target image IM2, the Softmax value of the class 2 exceeds the threshold value. In the first target images IM3 and IM4, Softmax values of all classes are less than the threshold value.

In the case of FIG. 7A, since the first target images IM1 and IM2 each have a Softmax value exceeding the threshold value, a pseudo label is assigned. Specifically, a pseudo label associated with class 3 is assigned to the first target image IM1, and a pseudo label associated with class 2 is assigned to the first target image IM2. Since the first target images IM3 and IM4 do not have a Softmax value exceeding the threshold value, a pseudo label is not assigned. However, the third cross entropy unit 17 calculates the self-learning loss using the Softmax values of all classes in each of the first target images IM1 to IM4.

In the maximum logit masking of FIG. 7B, the first target images IM1 and IM2 are handled the same as in FIG. 7A. For the first target images IM3 and IM4, since all the Softmax values of the three classes are less than the threshold value, a pseudo label is assigned, but the largest logit value is masked. The third cross entropy unit 17 masks the maximum value among the logit values of the three classes of each of the first target images IM3 and IM4, and calculates the self-learning loss using the Softmax value calculated one more time using the logit values of the other classes. The reason why the maximum logit value of the Softmax values less than the threshold value is masked is to increase the cross entropy error of the corresponding first target image and feed back the incorrect classification result.

In the full logit masking of FIG. 7C, the first target images IM1 and IM2 are handled the same as in FIG. 7A. For the first target images IM3 and IM4, since all the Softmax values of the three classes are less than the threshold value, the pseudo label is assigned, but all the logit values are masked. The third cross entropy unit 17 masks all the Softmax values of the three classes of the first target images IM3 and IM4 and calculates the self-learning loss. The reason is to feed back the incorrect classification result due to the influence of the first target image having a small Softmax value by masking all the logit values of the Softmax values less than the threshold value.

Figure 8:
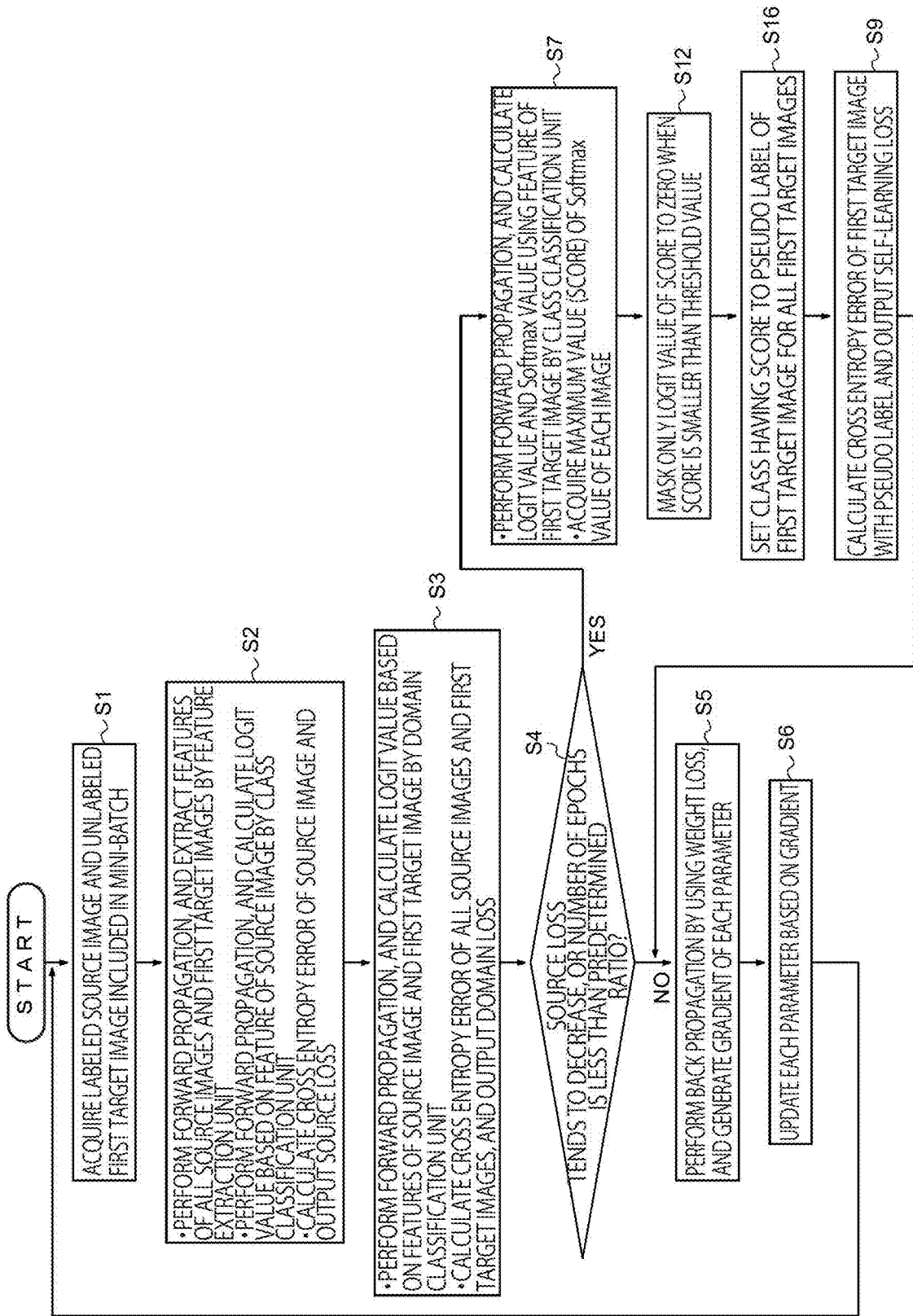
FIG. 8 is a flowchart illustrating a processing operation of the maximum logit masking of FIG. 7B.
Figure 9:
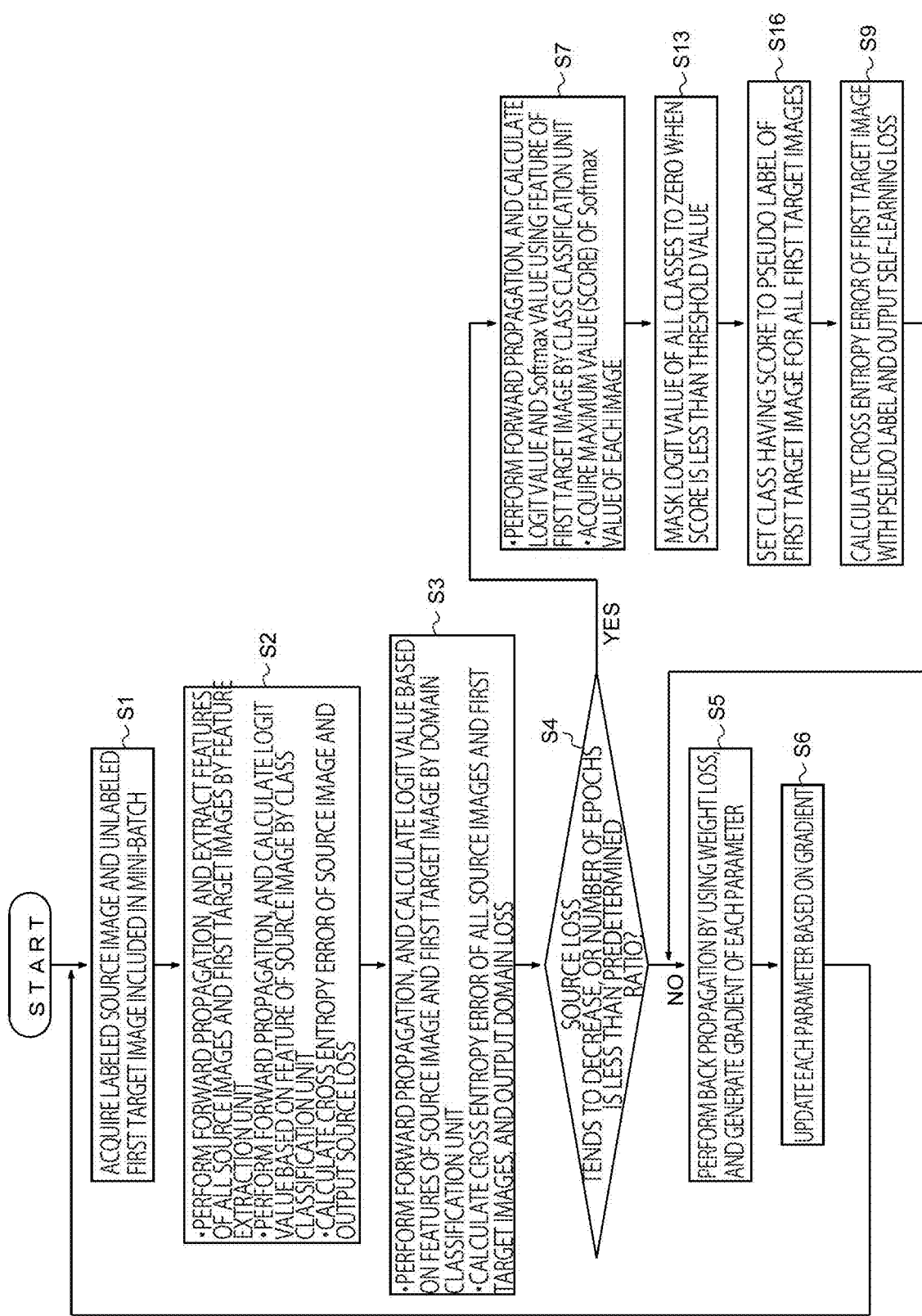
FIG. 9 is a flowchart illustrating a processing operation of the full logit masking of FIG. 7C.

FIGS. 8 and 9 are flowcharts illustrating processing operations of the image processing apparatus 1 according to the third modification of the first embodiment. FIG. 8 illustrates the maximum logit masking processing operation of FIG. 7B, and FIG. 9 illustrates the full logit masking processing operation of FIG. 7C.

The flowchart of FIG. 8 is obtained by adding S12 and S16 instead of S8 of the flowchart of FIG. 3. S12 is executed after the maximum value of the Softmax value of the first target image is calculated as a score in S7 during the self-learning.

In S12, in a case where the score calculated in S7 is smaller than a threshold value, only the logit value of the class having the Softmax value of the score is set to zero. Setting the logit value to zero may be referred to herein as "masking to zero". When masking the logit value, the logit value may be set to an any value other than zero. After masking the logit value, the class classification unit 6 calculates the Softmax value again. As a result, the Softmax value changes before and after masking the logit value. By performing the logit masking, the cross entropy error in the third cross entropy unit 17 is increased, and negative feedback is performed. On the other hand, in a case where the logit masking is not performed, the cross entropy error is reduced and positive feedback is performed.

When the process of S12 is completed, the process of S16 is performed. In S16, the class associated with the score is set as the pseudo label for all the first target images.

The flowchart of FIG. 9 is obtained by adding S13 and S16 instead of S8 of the flowchart of FIG. 3. S13 is executed after the maximum value of the Softmax value of the first target image is calculated as a score in S7 during the self-learning.

In S13, in a case where the score calculated in S7 is smaller than the threshold value, the logit values of all the classes in the first target image are set to zero. In next S16, the class associated with the score is set as the pseudo label for all the first target images.

As described above, in the third modification of the first embodiment, the maximum logit masking or the full logit masking is performed. In the maximum logit masking, in a case where the score that is the maximum value of the Softmax value output from the class classification unit 6 is smaller than the threshold value, the logit value of the class having the score is set to zero, so that the cross entropy error increases. Therefore, negative feedback is performed in some of the first target images. In addition, in the full logit masking, in a case where the score that is the maximum value of the Softmax value output from the class classification unit 6 is smaller than the threshold value, all the logit values are set to zero. Therefore, neutral feedback is performed in the first target image in which the Softmax value is equal to or less than the threshold value.

Fourth Modification of First Embodiment

A fourth modification of the first embodiment performs masking different from that of the third modification.

Figure 10:
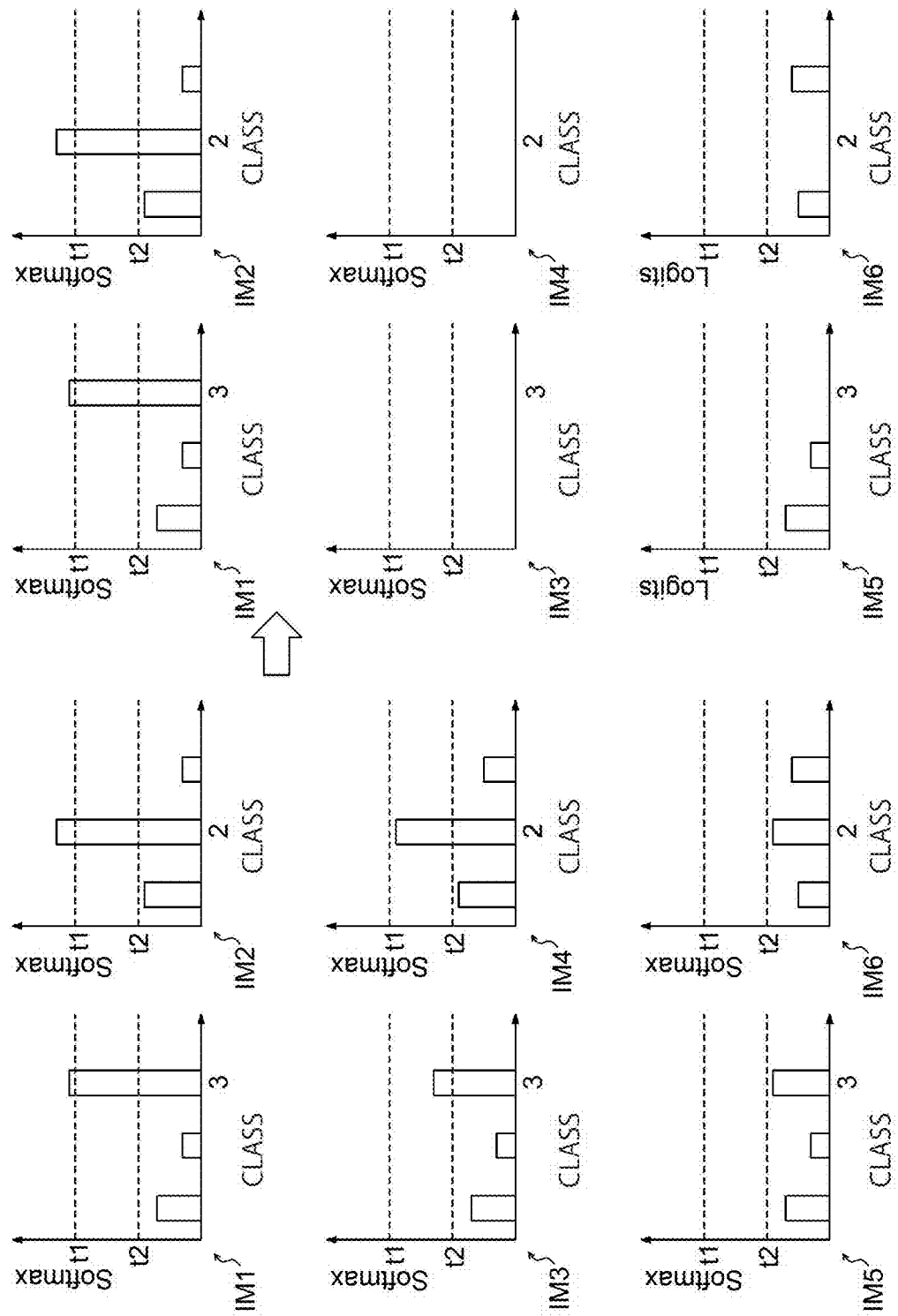
FIG. 10 is a diagram for explaining an operation of a fourth modification of the first embodiment.

A image processing apparatus 1 according to the fourth modification of the first embodiment has a block configuration similar to that in FIGS. 1 and 2. FIG. 10 is a diagram for explaining an operation of the fourth modification of the first embodiment.

FIG. 10 is a bar graph showing Softmax values for respective classes of six first target images IM1 to IM6 in a certain mini-batch. An example in which each of the first target images IM1 to IM6 has Softmax values of three classes is illustrated. In FIG. 10, two threshold values t1 and t2 with respect to the Softmax value illustrated on the vertical axis are indicated by dotted lines. In the example of FIG. 10, in the first target image IM1, the Softmax value of the class 3 is greater than or equal to the first threshold value t1, and the Softmax values of the class 1 and the class 2 are less than the second threshold value t2. In the first target image IM2, the Softmax value of the class 2 is greater than or equal to the first threshold value t1, and the Softmax values of the classes 1 and 3 are less than the second threshold value t2. A pseudo label associated with class 3 is assigned to the first target image IM1. A pseudo label associated with class 2 is assigned to the first target image IM2.

In the first target image IM3, the Softmax value of the class 3 is less than the first threshold value t1 and equal to or more than the second threshold value t2, and the Softmax values of the classes 1 and 2 are less than the second threshold value t2. In the first target image IM4, the Softmax value of the class 2 is less than the first threshold value t1 and equal to or more than the second threshold value t2, and the Softmax values of the classes 1 and 3 are less than the second threshold value t2. In the first target image IM3 and the first target image IM4, since the maximum value of the Softmax value is less than the first threshold value t1 and equal to or greater than the second threshold value t2, the logit values of all classes are masked to zero.

In the first target image IM5 and the first target image IM6, the Softmax values of all classes of are less than the second threshold value t2. In this case, only the class having the maximum value of the logit value is masked to zero. That is, the logit value of the class 3 is masked to zero in the first target image IM5, and the logit value of the class 2 is masked to zero in the first target image IM6.

As illustrated in FIG. 10, in the fourth modification of the embodiment, when the Softmax values for respective classes in each first target image falls within a predetermined range, the logit values of all classes are masked to zero.

Figure 11:
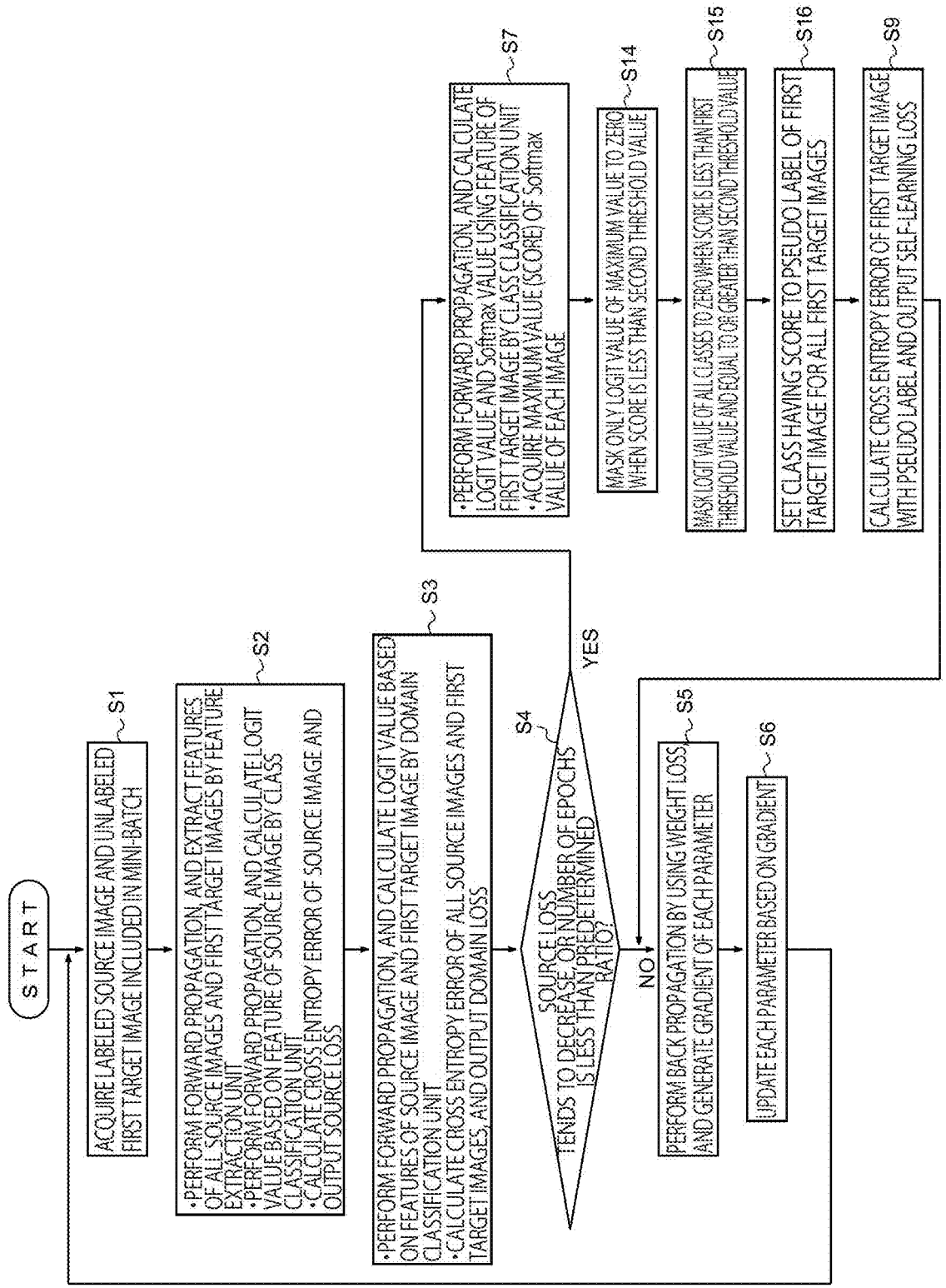
FIG. 11 is a flowchart illustrating a processing operation of an image processing apparatus according to the fourth modification of the first embodiment.

FIG. 11 is a flowchart illustrating a processing operation of the image processing apparatus 1 according to the fourth modification of the first embodiment. The flowchart of FIG. 11 is obtained by adding S14 to S16 instead of S8 of the flowchart of FIG. 3. S14 is executed after the maximum value of the Softmax value of the first target image is calculated as a score in S7. In S14, when the score is less than the second threshold value t2 (in the case of the first target images IM5 and IM6 of FIG. 10), only the logit value of the maximum value is masked to zero. In S15, when the score is less than the first threshold value t1 and equal to or greater than the second threshold value t2 (in the case of the first target images IM3 and IM4 of FIG. 10), the logit values of all classes of the first target image are masked to zero. In S16, the label of the class having the score is set as the pseudo label of the first target image for all the first target images.

After the process of S16, the process of the third cross entropy unit 17 is performed, and the self-learning loss is calculated (S9).

As described above, in the fourth modification of the first embodiment, the Softmax value output from the class classification unit 6 for each class for the first target image is compared with the first threshold value t1 and the second threshold value t2. In a case where the maximum Softmax value is less than the first threshold value t1 and equal to or greater than the second threshold value t2, the logit values of all classes are masked to zero, and in a case where the maximum Softmax value is less than the second threshold value t2, only the maximum logit value is masked to zero. As a result, it is possible to avoid a possibility that inappropriate learning is performed by the first target image in which the Softmax value falls within the predetermined range (in a case where the Softmax value is less than the first threshold value t1 and equal to or more than the second threshold value t2).

Fifth Modification of First Embodiment

In a fifth modification of the first embodiment, the deviation of the number of images between classes is eliminated.

Figure 12A:
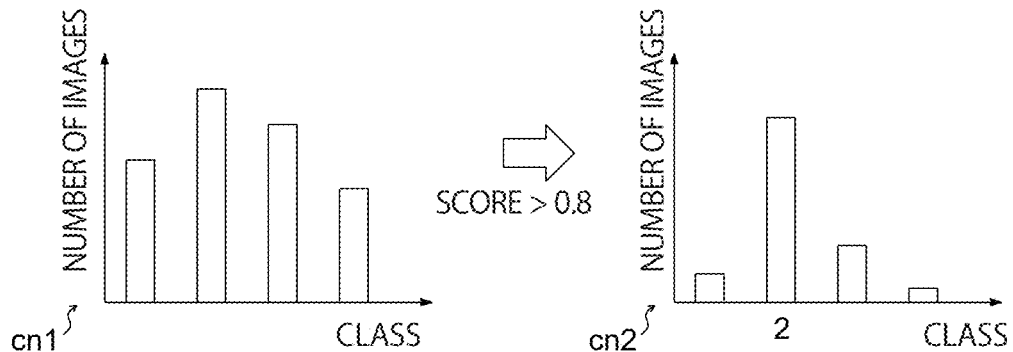
FIG. 12A is a diagram for describing an operation of a fifth modification of the first embodiment.
Figure 12B:
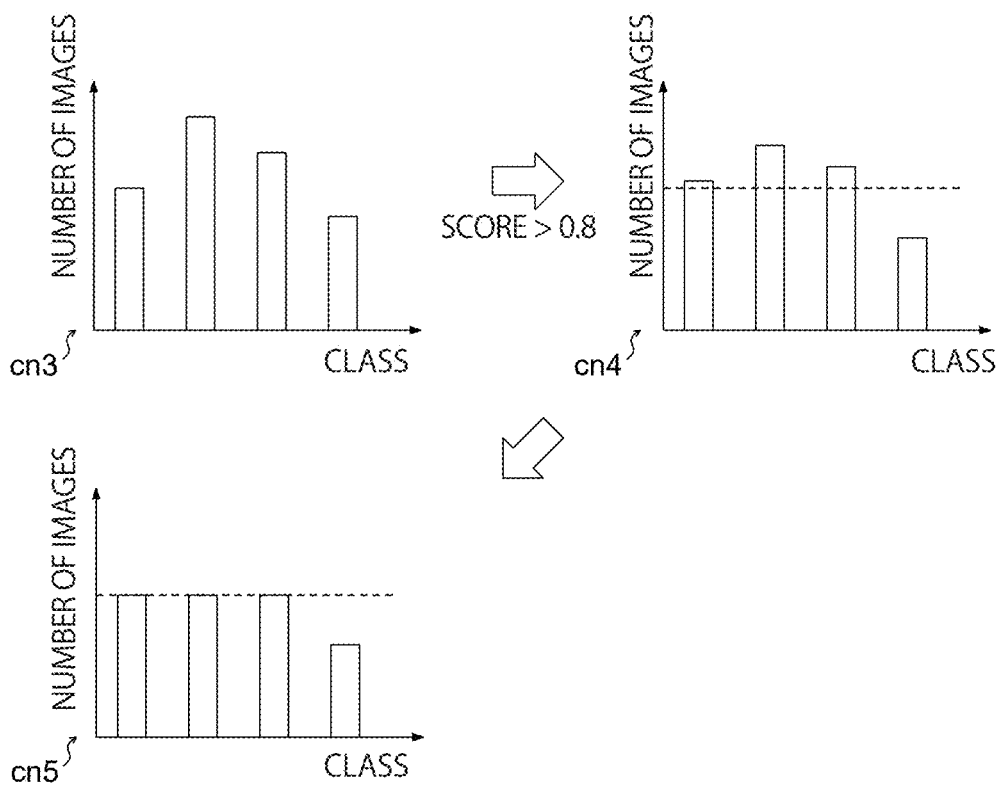
FIG. 12B is a diagram for describing another operation of the fifth modification of the first embodiment.

A image processing apparatus 1 according to the fifth modification of the first embodiment has a block configuration similar to that in FIGS. 1 and 2. FIGS. 12A and 12B are diagrams for explaining an operation of the fifth modification of the first embodiment. FIGS. 12A and 12B are diagrams illustrating classification results by the class classification unit 6 for a plurality of first target images in a certain mini-batch. In FIGS. 12A and 12B, the horizontal axis represents the class type, and the vertical axis represents the number of images. A distribution cn1 of the number of images for each class on the left side of FIG. 12A indicates a classification result by the class classification unit 6 for all the first target images in a certain mini-batch, and a distribution cn2 of the number of images for each class on the right side of FIG. 12A indicates a classification result by the class classification unit 6 for the first target images having a Softmax value equal to or larger than the threshold value (for example, 0.8 or larger) among the plurality of first target images in the mini-batch. The distribution cn2 of the number of images for each class on the right side of FIG. 12A illustrates an example in which only the number for class 2 is prominently large.

When there is a large deviation in the number of images for each class, a learning the first to third neural networks 5n, 6n, and 7n may not be appropriately performed. Therefore, in the fifth modification, the number of images for each class is adjusted.

The distribution cn3 of the number of images for each class at the left end in FIG. 12B is the same as the distribution cn1 of the number of images for each class in FIG. 12A. A distribution cn4 of the number of images for each class in the center of FIG. 12B indicates a classification result by the class classification unit 6 of the first target image having a Softmax value equal to or more than the threshold value (for example, 0.8 or more) among the plurality of first target images in the mini-batch. In the distribution cn5 of the number of images for each class at the right end of FIG. 12B, the number of first target images for each class having a Softmax value equal to or greater than the threshold value is made to be the same for each class. As a result, the number of the plurality of pseudo labels assigned to the plurality of first target images can be equally provided for each class. In the distributions cn3 and cn4 of the number of images for each class, the threshold value with respect to the number of images indicated on the vertical axis is indicated by a dotted line.

Figure 13:
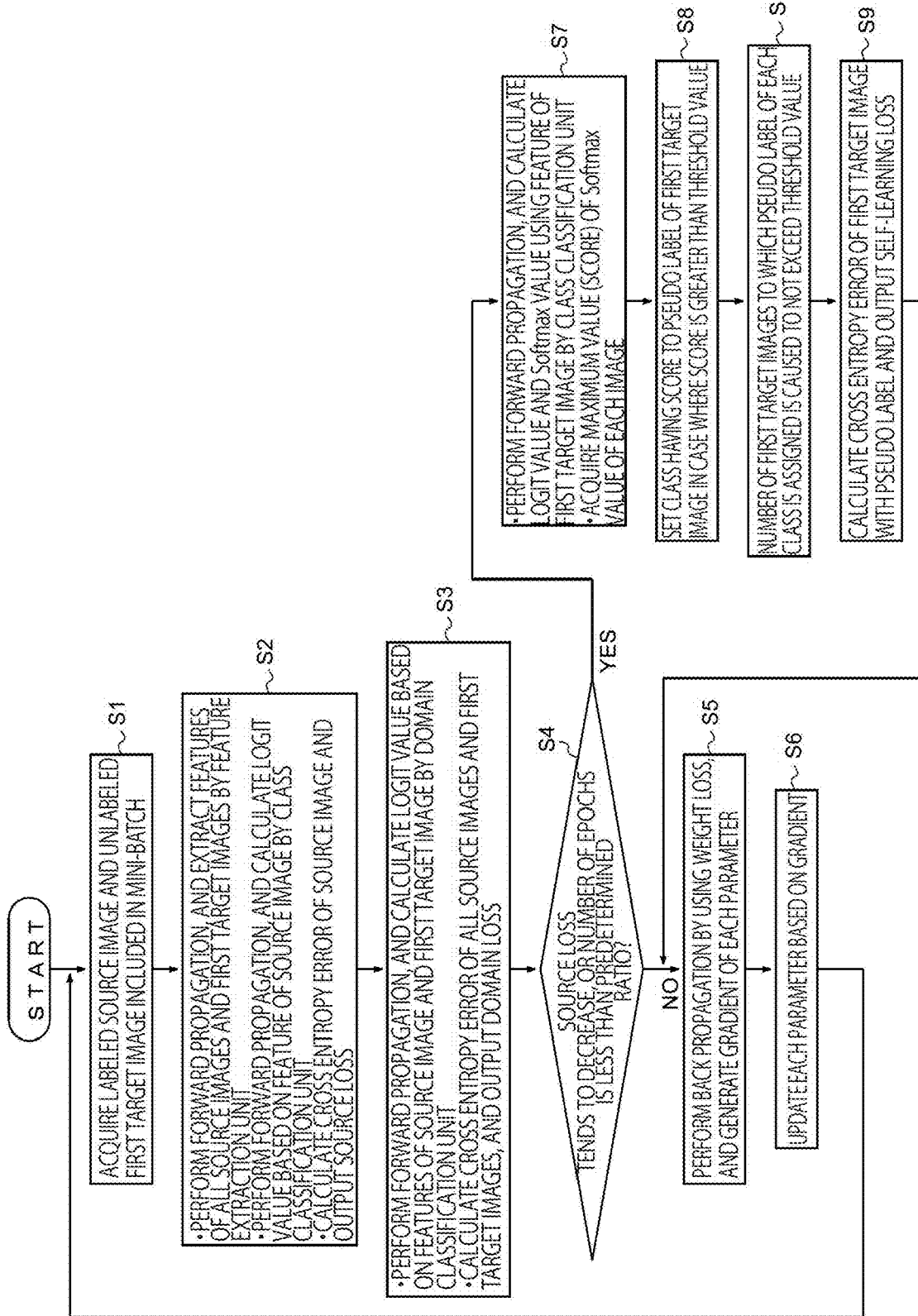
FIG. 13 is a flowchart illustrating a processing operation of an image processing apparatus according to the fifth modification of the first embodiment.

FIG. 13 is a flowchart illustrating a processing operation of the image processing apparatus 1 according to the fifth modification of the first embodiment. The flowchart of FIG. 13 is obtained by adding S17 to the flowchart of FIG. 3. S17 is executed after the process of assigning the pseudo label to the first target image having a Softmax value (score) greater than or equal to the threshold value is performed in S8.

In S17, the number of pseudo labels, for each class, assigned to the plurality of first target images in a certain mini-batch is caused to not exceed the threshold value. When the process of S17 ends, the process of the third cross entropy unit 17 is performed, and a self-learning loss is calculated (S9). Here, the threshold value in S8 and the threshold value in S17 are different values because the targets are different.

As described above, in the fifth modification of the first embodiment, when the pseudo labels are assigned to the plurality of first target images, the number of pseudo labels for each class is made uniform. Therefore, it is possible to avoid a possibility that the learning is performed under the strong influence of a specific class.

Sixth Modification of First Embodiment

In a sixth modification of the first embodiment, the total number of pseudo labels is adjusted regardless of the class.

Figure 14A:
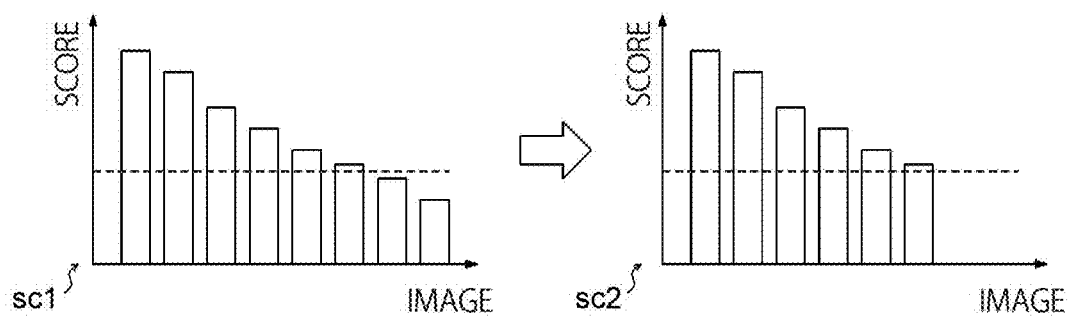
FIG. 14A is a diagram illustrating scores of a plurality of first target images in a mini-batch.
Figure 14B:
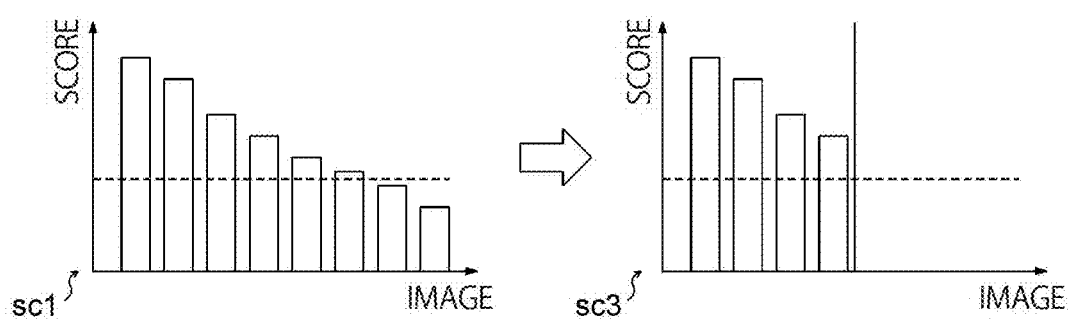
FIG. 14B is a diagram illustrating an example in which the score is equal to or greater than a predetermined threshold value and the number of extracted first target images is limited.

A image processing apparatus 1 according to the sixth modification of the first embodiment has a block configuration similar to that in FIGS. 1 and 2. FIGS. 14A and 14B are diagrams for explaining an operation of the fifth modification of the first embodiment. FIGS. 14A and 14B are diagrams illustrating scores of a plurality of first target images in a certain mini-batch, where the horizontal axis represents the type of the first target image, and the vertical axis represents the score. The score is the maximum value of the Softmax value output from the class classification unit 6 for the first target image.

FIG. 14A illustrates an example in which an entire first target image group sc2 having scores equal to or higher than a threshold value are extracted from a first target image group sc1. In the case of FIG. 14A, pseudo labels are assigned to the entire first target image group sc2 having scores equal to or greater than the threshold value. FIG. 14B illustrates an example in which the score is equal to or greater than the threshold value and the number of images in a first target image group sc3 extracted is limited.

Pseudo labels are assigned to images in the first target image group finally extracted based on FIG. 14B. As a result, the number of pseudo labels to be assigned can be limited.

Figure 15:
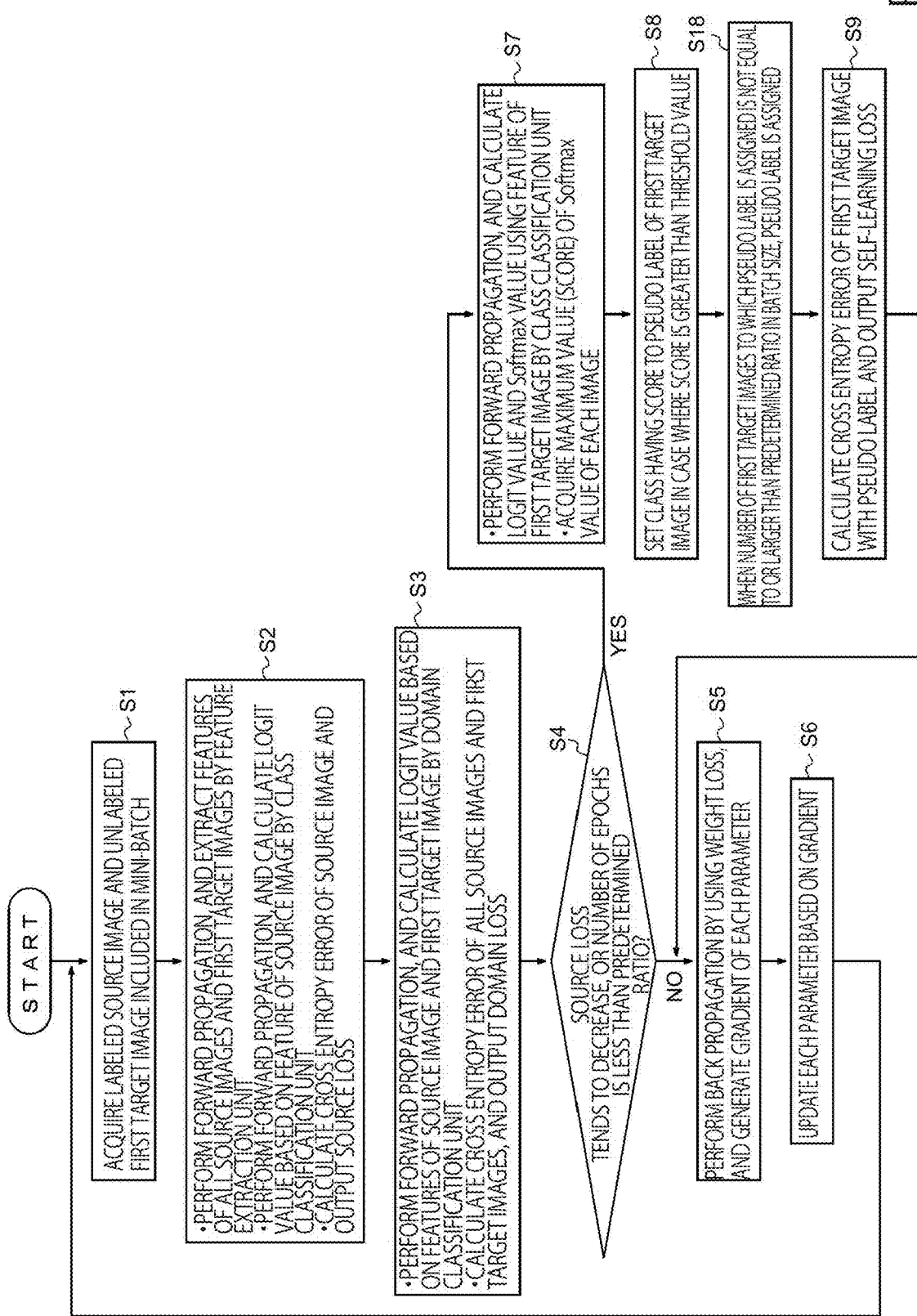
FIG. 15 is a flowchart illustrating a processing operation of an image processing apparatus according to a sixth modification of the first embodiment.

FIG. 15 is a flowchart illustrating a processing operation of the image processing apparatus 1 according to the sixth modification of the first embodiment. The flowchart of FIG. 15 is obtained by adding S18 to the flowchart of FIG. 3. S18 is executed after the first target image having the Softmax value (score) equal to or greater than the threshold value is identified in S8.

In S18, in a case where the number of first target images to each of which the pseudo label is assigned is not equal to or greater than a predetermined ratio (that is, less than the predetermined ratio) with respect to the total number of first target images included in the mini-batch, the pseudo label is assigned to the corresponding first target image. When the process of S18 ends, the process of the third cross entropy unit 17 is performed, and a self-learning loss is calculated (S9).

As described above, in the sixth modification of the first embodiment, since the total number of first target images to each of which the pseudo label is assigned is limited, the processing load of the image processing apparatus 1 can be reduced.

Seventh Modification of First Embodiment

In a seventh modification of the first embodiment, the weights of the source loss and the domain loss are adjusted according to the progress status of a self-learning.

Figure 16:
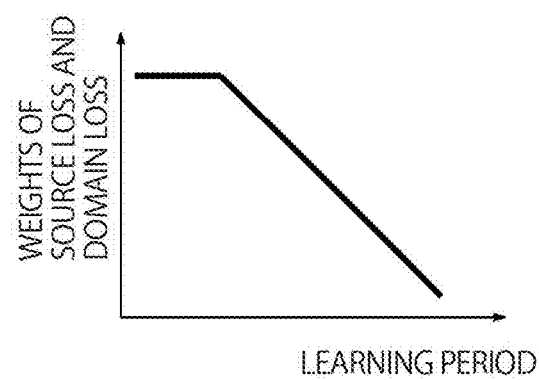
FIG. 16 is a diagram for explaining a seventh modification of the first embodiment.

A image processing apparatus 1 according to the seventh modification of the first embodiment has a block configuration similar to that in FIGS. 1 and 2. FIG. 16 is a diagram for explaining the seventh modification of the first embodiment. In FIG. 16, the horizontal axis represents a period (learning period) from the start of the self-learning, and the vertical axis represents weight values of the source loss and the domain loss. The weight loss generation unit 18 illustrated in FIG. 1 adjusts weights of the source loss output from the first cross entropy unit 15, the domain loss output from the second cross entropy unit 16, and the self-learning loss output from the third cross entropy unit 17 to obtain a final weight loss. The weight loss generation unit 18 may vary the weights of the source loss and the domain loss according to the progress status of the self-learning by the self-learning unit 9.

In the example of FIG. 16, the weights of the source loss and the domain loss are decreased as the self-learning progresses. That is, as the self-learning progresses, the self-learning unit 9 performs the self-learning by placing more importance on the self-learning loss than the source loss and the domain loss.

The weight loss generation unit 18 calculates the final weight loss loss, based on the following Expression (1), for example.

$$\text{loss} = \text{theta}_d \times \text{domain\_loss} + \text{theta}_s \times \text{source\_loss} + \text{theta}_p \times \text{selftrain\_loss} \quad (1)$$

The first term on the right side of Expression (1) is a value obtained by multiplying the domain loss domain_loss by the weight coefficient $\text{theta}_d$, the second term on the right side is a value obtained by multiplying the source loss source_loss by the weight coefficient $\text{theta}_s$, and the third term on the right side is a value obtained by multiplying the self-learning loss selftrain_loss by the weight coefficient $\text{theta}_p$. The weight coefficients $\text{theta}_d$, $\text{theta}_s$, and $\text{theta}_p$ can be changed according to the degree of progress of the self-learning.

The weight coefficients $\text{theta}_d$, $\text{theta}_s$, and $\text{theta}_p$ may be values obtained by multiplying a function $f(\lambda)$ expressed by the following Expression (2) by an any fixed value.

$$f(\lambda) = \begin{cases} 1, & \lambda < \lambda_s \\ 1 - \dfrac{\lambda - \lambda_s}{\lambda_{max} - \lambda_s}, & \lambda \geq \lambda_s \end{cases} \quad (2)$$

Note that the expression for calculating the weight loss is not limited to Expressions (1) and (2) described above.

Figure 17:
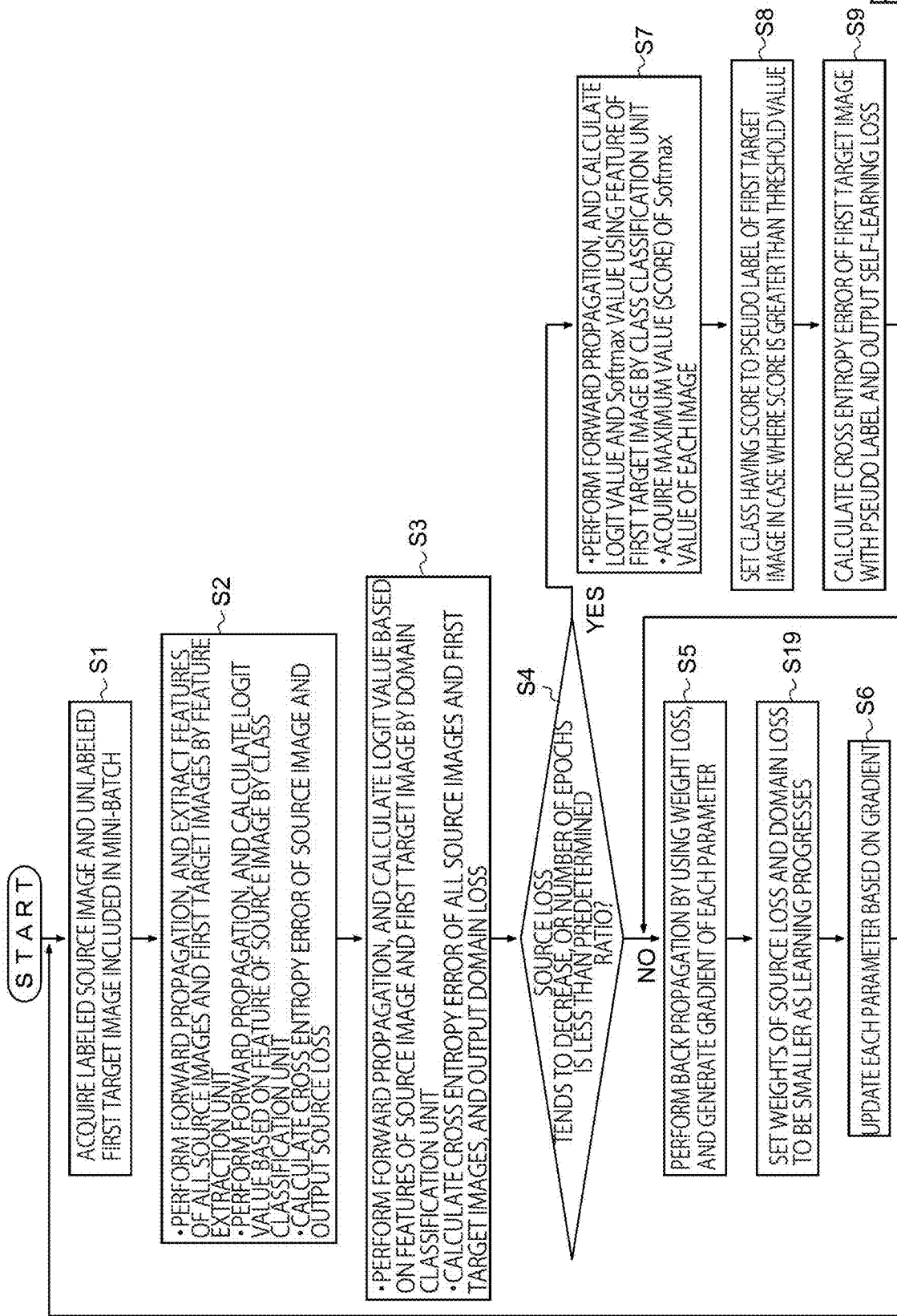
FIG. 17 is a flowchart illustrating a processing operation of an image processing apparatus according to the seventh modification of the first embodiment.

FIG. 17 is a flowchart illustrating a processing operation of the image processing apparatus 1 according to the seventh modification of the first embodiment. The flowchart of FIG. 17 is obtained by adding S19 to the flowchart of FIG. 3. In S19, a weight loss used when the back propagation process is performed in S5 is calculated. The weight loss is calculated by, for example, Expressions (1) and (2) described above. As the learning progresses, the weight loss is calculated such that the weights of the source loss and the domain loss decrease. When the process of S19 is completed, the processes of S6 and subsequent processes are performed. Here, the order of the processes of S5 and S19 may be switched.

As described above, in the seventh modification of the first embodiment, since the weights of the source loss and the domain loss are changed according to the progress status of the self-learning, the learning can be efficiently performed.

Second Embodiment

The learning unit 10 of the first embodiment learns the first to third neural networks 5n, 6n, and 7n by performing the back propagation process based on a source loss, a domain loss, and a self-learning loss, but the processing operation of the learning unit 10 of the second embodiment is different from that of the first embodiment.

Figure 18:
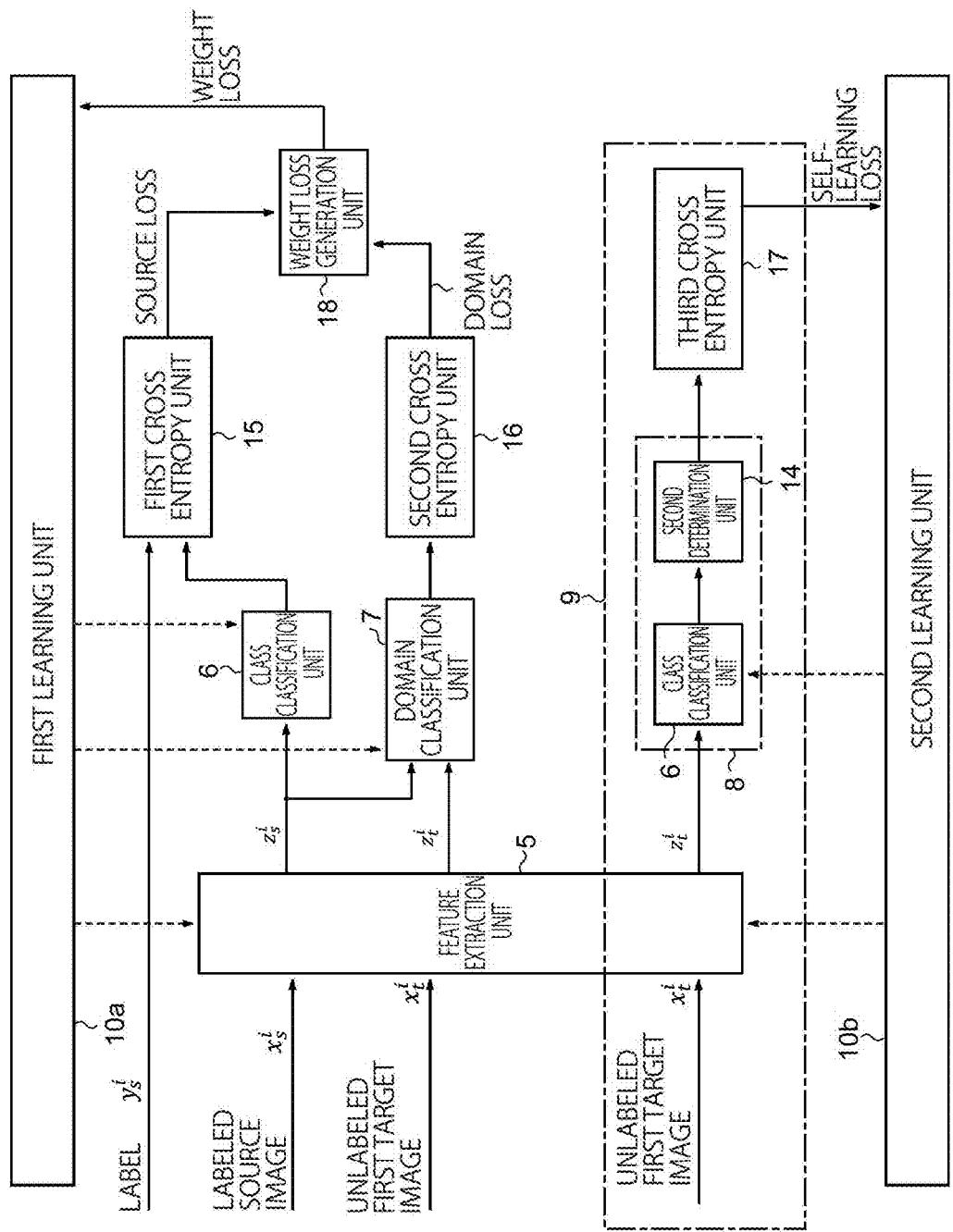
FIG. 18 is a block diagram of a main part of an image processing apparatus according to a second embodiment.

FIG. 18 is a block diagram of a main part of an image processing apparatus 1a according to the second embodiment. In the image processing apparatus 1a according to the second embodiment, a first learning unit 10a and a second learning unit 10b each independently perform the back propagation process to learn the first to third neural networks 5n, 6n, and 7n.

The first learning unit 10a learns the first to third neural networks 5n, 6n, and 7n by performing the back propagation process based on the source loss output from the first cross entropy unit 15 and the domain loss output from the second cross entropy unit 16. The weight loss generation unit 18 generates a weight loss based on the source loss and the domain loss. The first learning unit 10a performs the back propagation process based on the weight loss generated based on the source loss and the domain loss.

On the other hand, the second learning unit 10b learns the first and second neural networks 5n and 6n by performing the back propagation process based on the self-learning loss output from the third cross entropy unit 17.

As described above, the second embodiment is different from the first embodiment in that learning is performed in two stages.

Figure 19:
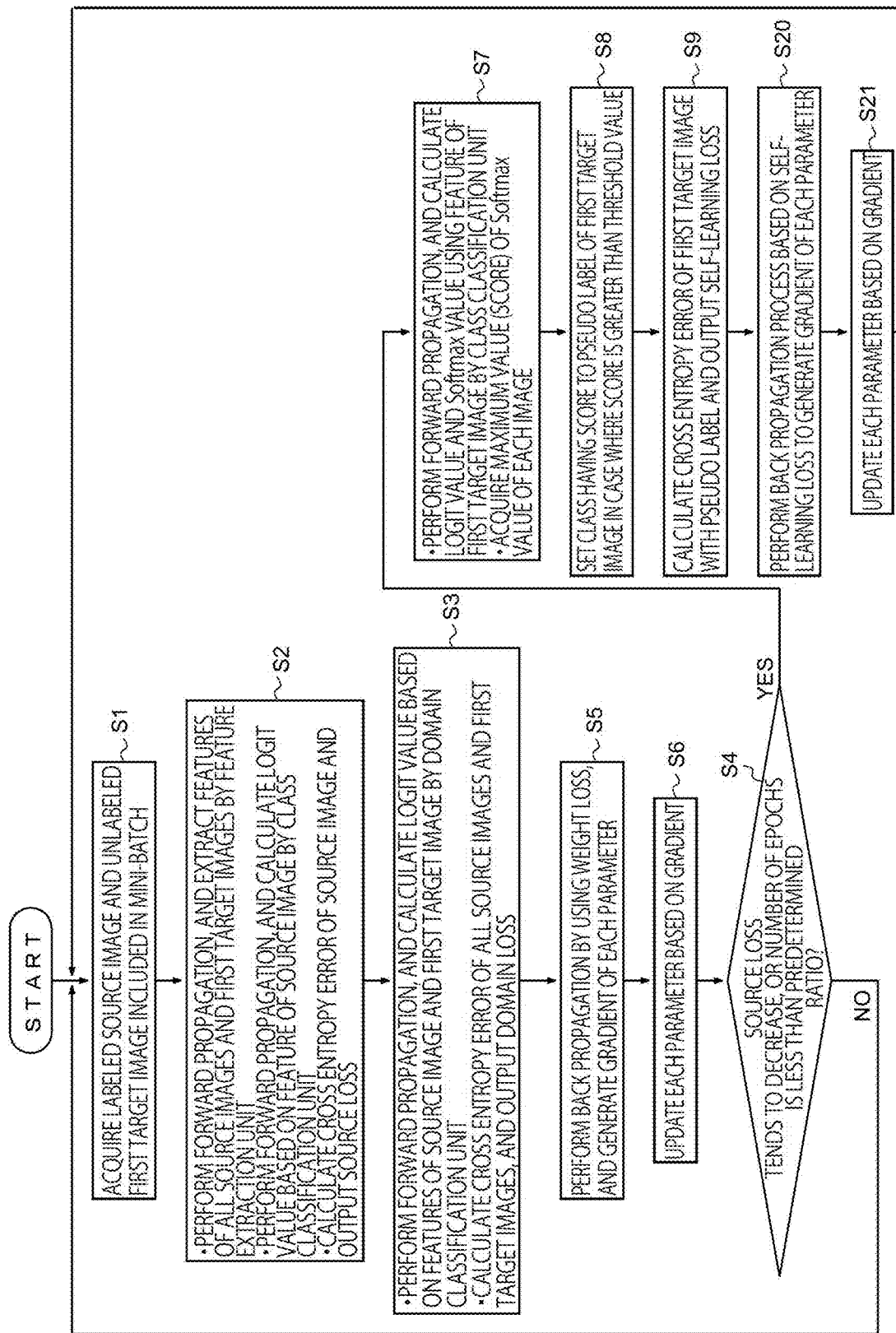
FIG. 19 is a flowchart illustrating a processing operation of the image processing apparatus according to the second embodiment.

FIG. 19 is a flowchart illustrating a processing operation of the image processing apparatus 1a according to the second embodiment. The flowchart of FIG. 19 is obtained by adding S20 and S21 to the flowchart of FIG. 3, and partially changing the order of executing the processes of S1 to S9 from that in FIG. 3.

In the flowchart of FIG. 19, S1, S2, S3, S5, S6, and S4 are executed in this order. With these processes, learning by the first learning unit 10a is performed.

When the self-learning is started according to the determination result of S4, the processes of S7 to S9 are sequentially executed. Thereafter, learning by the second learning unit 10b is performed in S20 and S21. In S20, a gradient of each parameter of the first and second neural networks 5n and 6n is generated by performing the back propagation process based on the self-learning loss. In S21, each parameter is updated based on the gradient of the parameter. When the process of S21 is completed, the processes of S1 and subsequent processes are repeated.

As described above, in the second embodiment, a learning the first to third neural networks 5n, 6n, and 7n by the back propagation process based on the source loss and the domain loss, and a learning the first and second neural networks 5n and 6n by the back propagation process based on the self-learning loss can be performed in two stages.

Third Embodiment

In the first and second embodiments, it is assumed that an unlabeled first target image is acquired, whereas in the third embodiment, a labeled second target image is acquired in addition to the unlabeled first target image.

Figure 20:
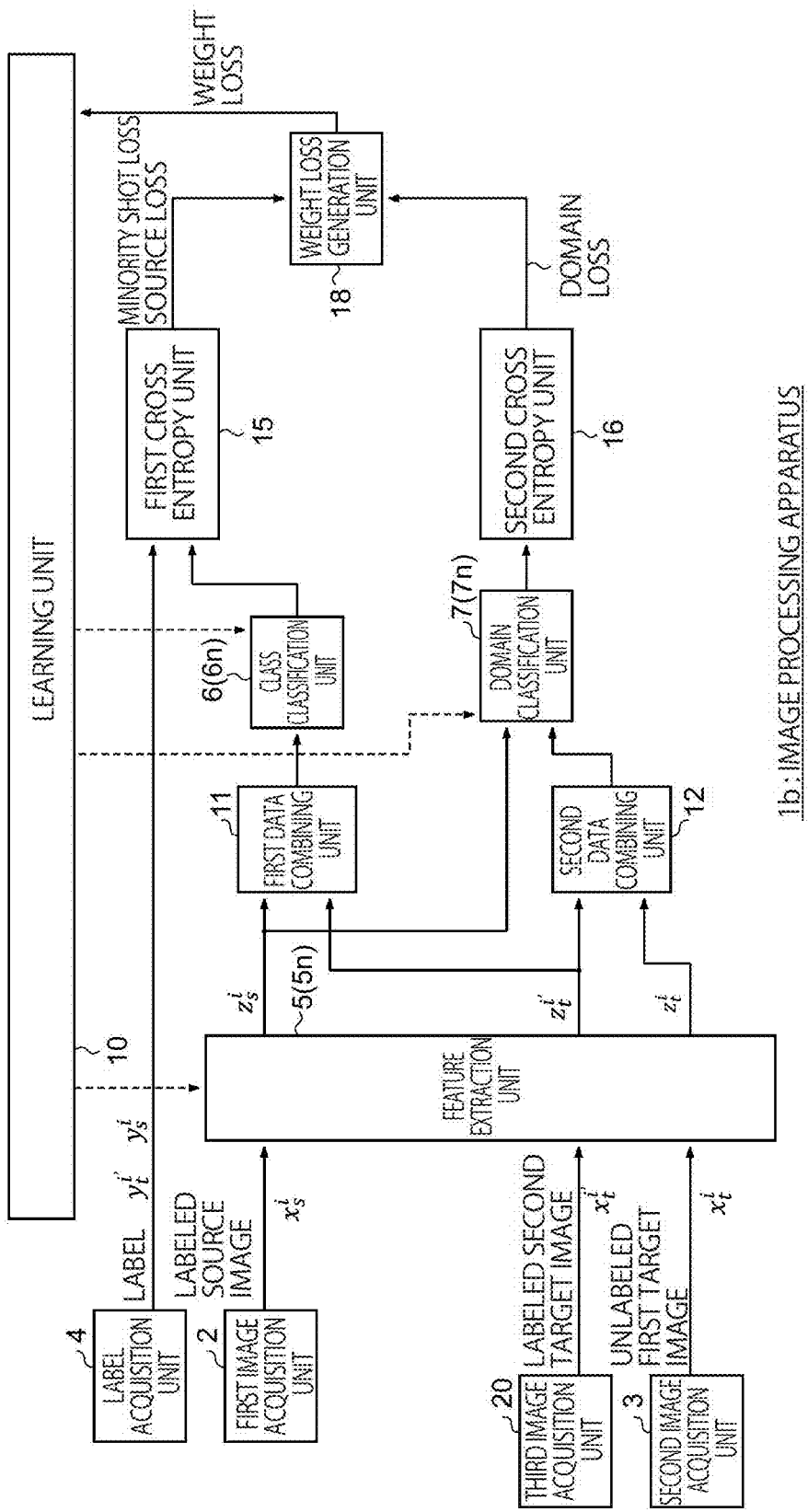
FIG. 20 is a block diagram illustrating a schematic configuration of an image processing apparatus according to a third embodiment.

FIG. 20 is a block diagram illustrating a schematic configuration of an image processing apparatus 1b according to a third embodiment. The image processing apparatus 1b in FIG. 20 includes the first image acquisition unit 2, the second image acquisition unit 3, a third image acquisition unit 20, the label acquisition unit 4, the feature extraction unit 5, the class classification unit 6, the domain classification unit 7, the first data combining unit 11, the second data combining unit 12, the first cross entropy unit (first loss calculation unit) 15, a second cross entropy unit (second loss calculation unit) 16, and the weight loss generation unit 18. Among them, the first data combining unit 11, the second data combining unit 12, the first cross entropy unit (first loss calculation unit) 15, the second cross entropy unit (second loss calculation unit) 16, and the weight loss generation unit 18 can be omitted as appropriate.

As described above, unlike the configuration of FIG. 1, in the image processing apparatus 1b of FIG. 20, the third image acquisition unit 20 is newly added and the self-learning unit 9 is omitted.

The third image acquisition unit 20 acquires the second target data to which the label is assigned. Since the second target data is image data, the second target data is hereinafter referred to as a second target image $x_t^{i'}$. The number of the second target images is a smaller than that of the first target image, and may be only one image. The learning effect can be improved using the labeled second target data.

The feature extraction unit 5 includes the first neural network 5n that extracts a feature $z_s^i$ of the source image, a feature $z_t^i$ of the first target image that is not labeled, and a feature $z_t^{i'}$ of the second target image.

The class classification unit 6 includes the second neural network 6n that performs class classification of the source image and the second target image based on the features of the source image and the second target image.

The domain classification unit 7 includes the third neural network 7n that performs domain classification of the source image, the first target image, and the second target image based on the features of the source image, the first target image, and the second target image.

The first cross entropy unit 15 calculates a source loss and a minority shot loss indicating reliability of the class classification of the source image, the first target image, and the second target image by the class classification unit 6. The second cross entropy unit 16 calculates a domain loss indicating reliability of the domain classification of the source image, the first target image, and the second target image by the domain classification unit 7. The weight loss generation unit 18 generates a weight loss obtained by weighting the source loss, the minority shot loss, and the domain loss.

The learning unit 10 learns the first to third neural networks 5n, 6n, and 7n by performing the back propagation process based on the weight loss.

The image processing apparatus 1b in FIG. 20 may include the first data combining unit 11 and the second data combining unit 12. The first data combining unit 11 inputs data obtained by combining the feature data of the source image with the feature data of the second target image to the class classification unit 6. The second data combining unit 12 inputs data obtained by combining the feature data of the first target image with the feature data of the second target image to the domain classification unit 7.

Figure 21:
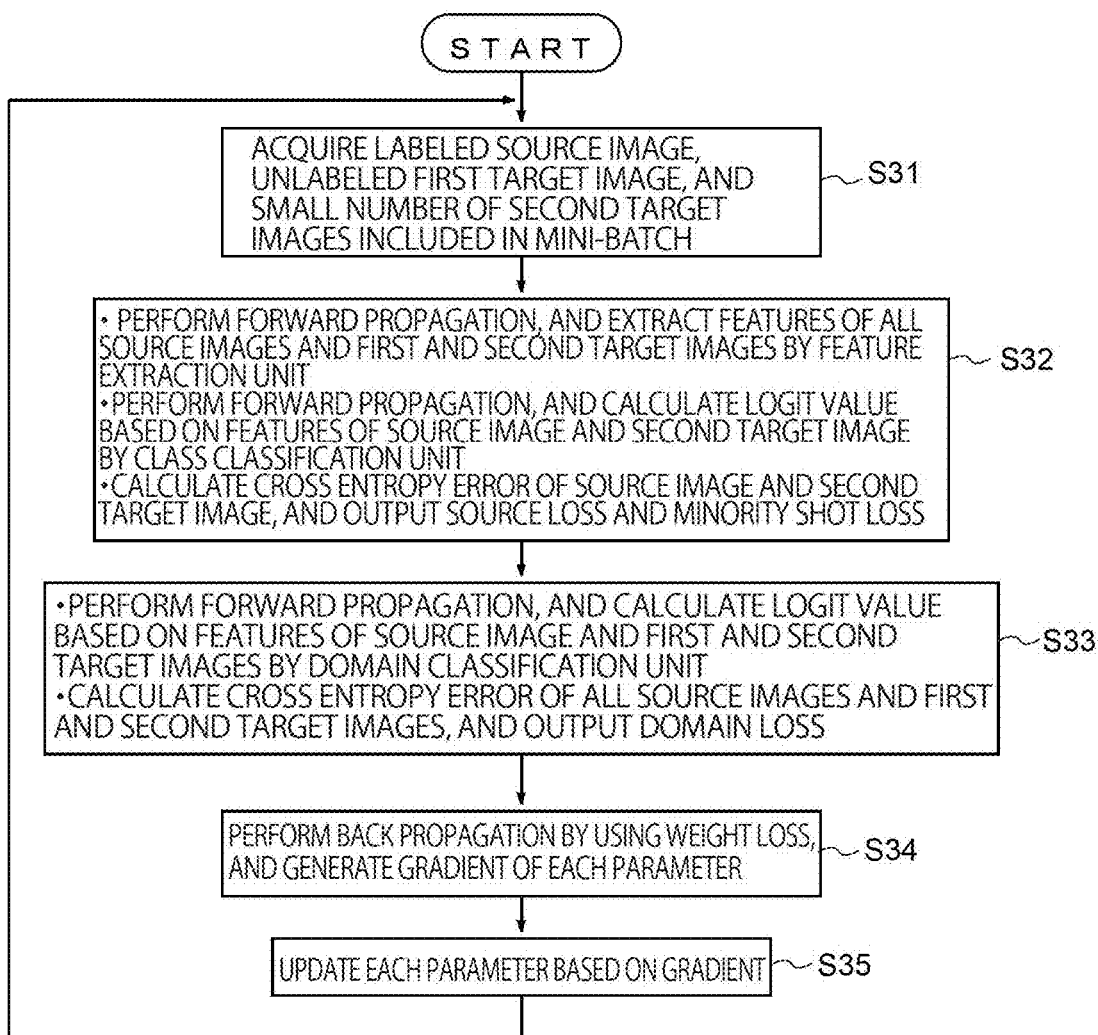
FIG. 21 is a flowchart illustrating a processing operation of the image processing apparatus according to the third embodiment.

FIG. 21 is a flowchart illustrating a processing operation of the image processing apparatus 1b according to the third embodiment. The process of the flowchart of FIG. 21 is performed for each mini-batch including a plurality of source images, a plurality of first target images, and a small number of second target images. In the flowchart of FIG. 21, a learning of the first to third neural networks 5n, 6n, and 7n is performed with a mini-batch as a unit.

First, a plurality of labeled source images Xs, a plurality of first target images $X_t^u$, and a small number of second target images $X_t^l$ are acquired (S31).

Next, the forward propagation process is performed, and the feature extraction unit 5 extracts features of all the source images Xs, the first target images $X_t^u$, and the second target images $X_t^l$ included in the mini-batch to be processed. In addition, the class classification unit 6 calculates a logit value using the features of the source image Xs and the second target image $X_t^l$ extracted by the feature extraction unit 5 to output a Softmax value from the logit value. The Softmax value is a value representing the certainty factor for each class, and the number of Softmax values is the same as the number of classes. The first cross entropy unit 15 calculates a cross entropy error of the Softmax value of each of the source image Xs and the second target image $X_t^l$ for each class to output the source loss and the minority shot loss (S32). The minority shot loss is a loss due to a cross entropy error of the second target image $X_t^l$.

Before and after the process of S2, by the forward propagation process, the domain classification unit 7 calculates a logit value using the source image Xs, a plurality of first target images $X_t^u$, and a small number of second target images $X_t^l$, and calculates a Softmax value from the logit value. The second cross entropy unit 16 calculates the cross entropy error of the Softmax value for each class for all the source images Xs, the first target images $X_t^u$, and the second target images $X_t^l$ to output the domain losses of the labels Xs=0, $X_t^u$=1, and $X_t^l$=1 (S33).

Next, the back propagation process is performed using a weight loss obtained by weighting the source loss, the domain loss, and the minority shot loss, and gradients of parameters in the feature extraction unit 5, the class classification unit 6, and the domain classification unit 7 are generated (S34). Next, parameters such as weights of the respective layers of the first to third neural networks 5n, 6n, and 7n are updated based on the generated gradients (S35).

As described above, in the third embodiment, the second target images with a small number of labels are input to the feature extraction unit 5 to perform the forward propagation process to calculate the minority shot loss, and the first to third neural networks 5n, 6n, and 7n are learned by the back propagation process based on the source loss, the domain loss, and the minority shot loss. The learning effect can be improved by using the second target images with a small number of labels.

First Modification of Third Embodiment

In a first modification of the third embodiment, the image processing apparatus 1b according to the third embodiment is provided with a self-learning function similar to that of the image processing apparatuses 1 and 1a according to the first and second embodiments.

Figure 22:
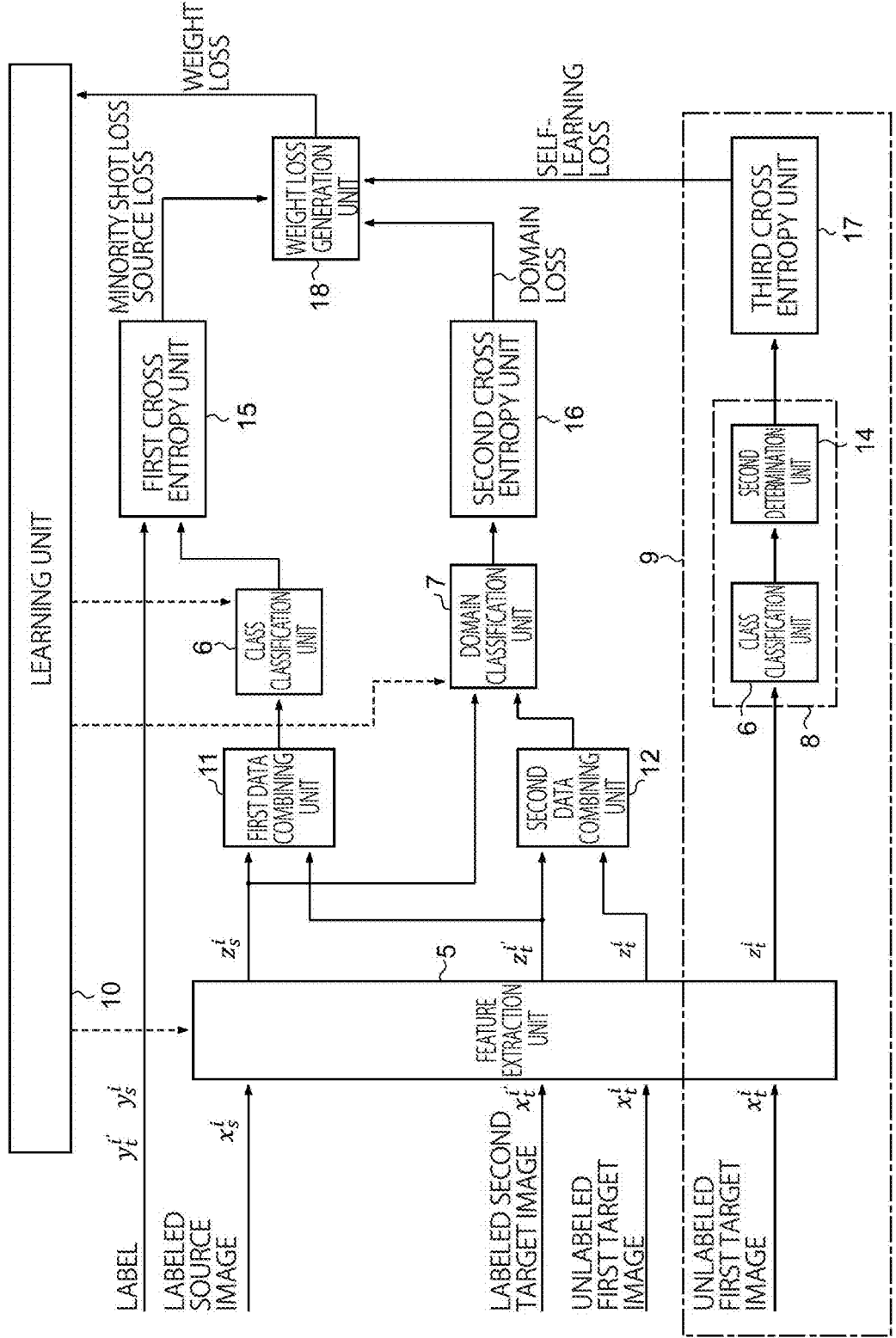
FIG. 22 is a block diagram illustrating a schematic configuration of an image processing apparatus according to a first modification of the third embodiment.

FIG. 22 is a block diagram illustrating a schematic configuration of an image processing apparatus 1c according to the first modification of the third embodiment. The image processing apparatus 1c in FIG. 22 is obtained by adding the self-learning unit 9 including the processing unit 8 to the configuration in FIG. 20.

The processing unit 8 assigns a pseudo label to the first target image using the class classification unit 6 including the second neural network 6n in the middle of learning.

The self-learning unit 9 inputs the first target image to which the pseudo label is assigned to the feature extraction unit 5, and self-learns the first to third neural networks 5n, 6n, and 7n. In addition, the self-learning unit 9 extracts the feature of the unlabeled first target image by the feature extraction unit 5, and calculates the self-learning loss by the third cross entropy unit 17 based on the Softmax value for each class output from the class classification unit 6 in the processing unit 8 based on the extracted feature.

The weight loss generation unit 18 generates a weight loss by weighting the source loss and the minority shot loss output from the first cross entropy unit 15, the domain loss output from the second cross entropy unit 16, and the self-learning loss output from the third cross entropy unit 17.

The learning unit 10 learns the first to third neural networks 5n, 6n, and 7n by performing the back propagation process based on the weight loss.

Figure 23:
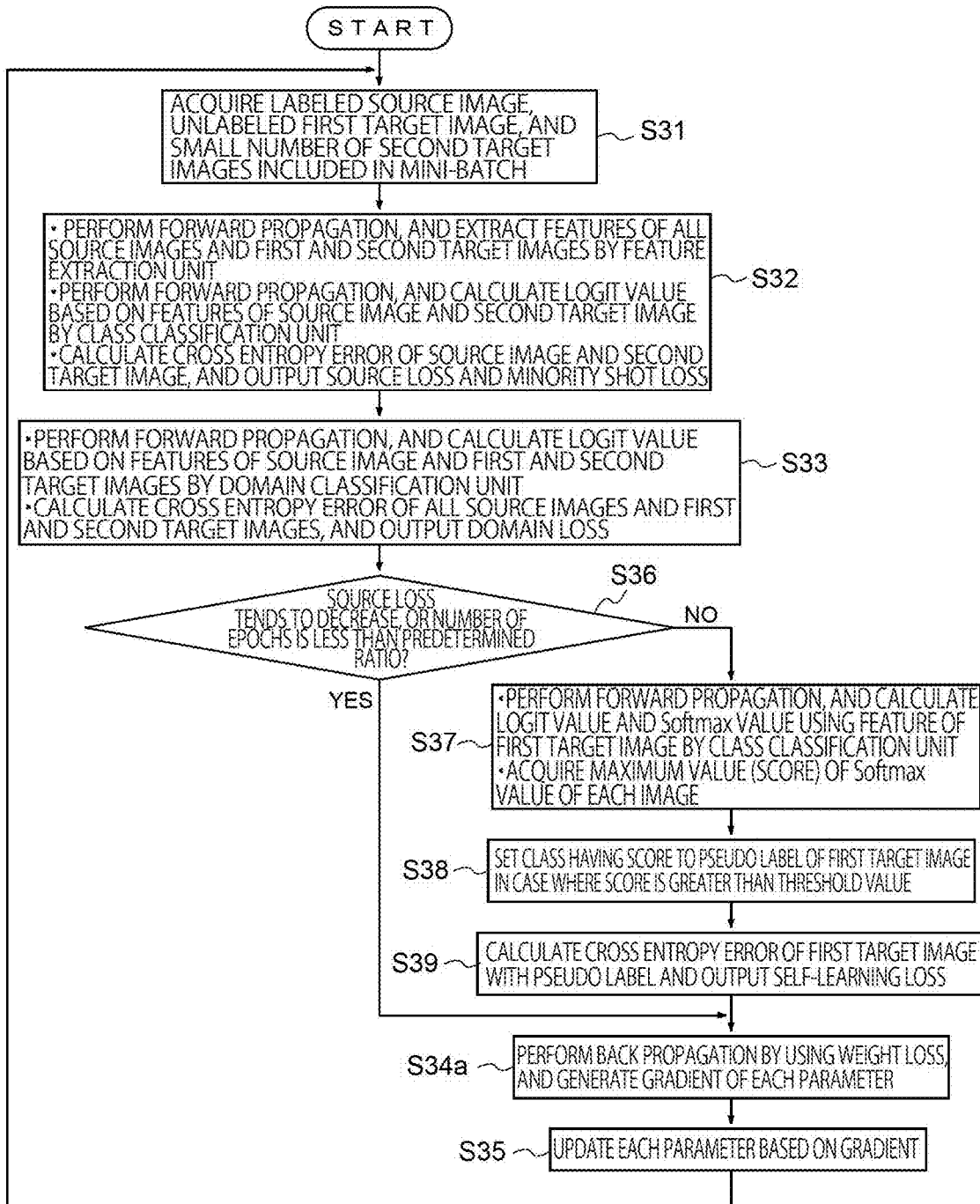
FIG. 23 is a flowchart illustrating a processing operation of an image processing apparatus according to the first modification of the third embodiment.

FIG. 23 is a flowchart illustrating a processing operation of the image processing apparatus 1c according to the first modification of the third embodiment. The flowchart of FIG. 23 is obtained by adding S36 to S39 to the flowchart of FIG. 21.

In S31 to S33 in FIG. 23, as in S31 to S33 in FIG. 21, the forward propagation process is performed to calculate the source loss, the domain loss, and the minority shot loss.

After the processes of S31 to S33 are performed on all the source images, the first target images, and the second target images in the mini-batch, it is determined whether the source loss tends to decrease, or whether the number of processed epochs is less than a predetermined ratio with respect to the total number of epochs (S36).

When S36 is NO, that is, in a case where the source loss does not tend to decrease, or in a case where the number of processed epochs reaches the predetermined ratio with respect to the total number of epochs, the self-learning processes of S37 to S39 are performed. In the self-learning, the forward propagation process is performed. The class classification unit 6 performs class classification of the first target image $X_t^u$ based on the feature of the first target image $X_t^u$. The class classification unit 6 outputs a Softmax value for each class. The maximum value of the Softmax value of each first target image $X_t^u$ is set as a score (S37).

Next, when the score of the first target image is larger than a predetermined threshold value, the processing unit 8 assigns a pseudo label to the first target image with a class associated with the score of the first target image (S38). As a result, the first target image $X_t^p$ with the pseudo label is generated.

Next, the third cross entropy unit 17 calculates a cross entropy error based on the Softmax value of the first target image $X_t^p$ with the pseudo label for each class to output a self-learning loss (S39).

Next, the learning unit 10 performs the back propagation process based on the source loss, the domain loss, the minority shot loss, and, in some cases, the self-learning loss. As a result, gradients of parameters of the first to third neural networks 5n, 6n, and 7n are generated (S34a). When S36 is YES, the processes of S34a is performed.

Next, the learning unit 10 updates the parameters of the first to third neural networks 5n, 6n, and 7n based on the generated parameter gradients (S35). When the process of S35 ends, the processes of S31 and subsequent processes are repeated.

As described above, in the first modification of the third embodiment, not only a small number of second target images with labels are acquired, but also the self-learning unit 9 is provided, so that an appropriate label can be assigned to the unlabeled first target image.

Second Modification of Third Embodiment

A second modification of the third embodiment is to eliminate variation in the number of source images between classes.

Figure 24:
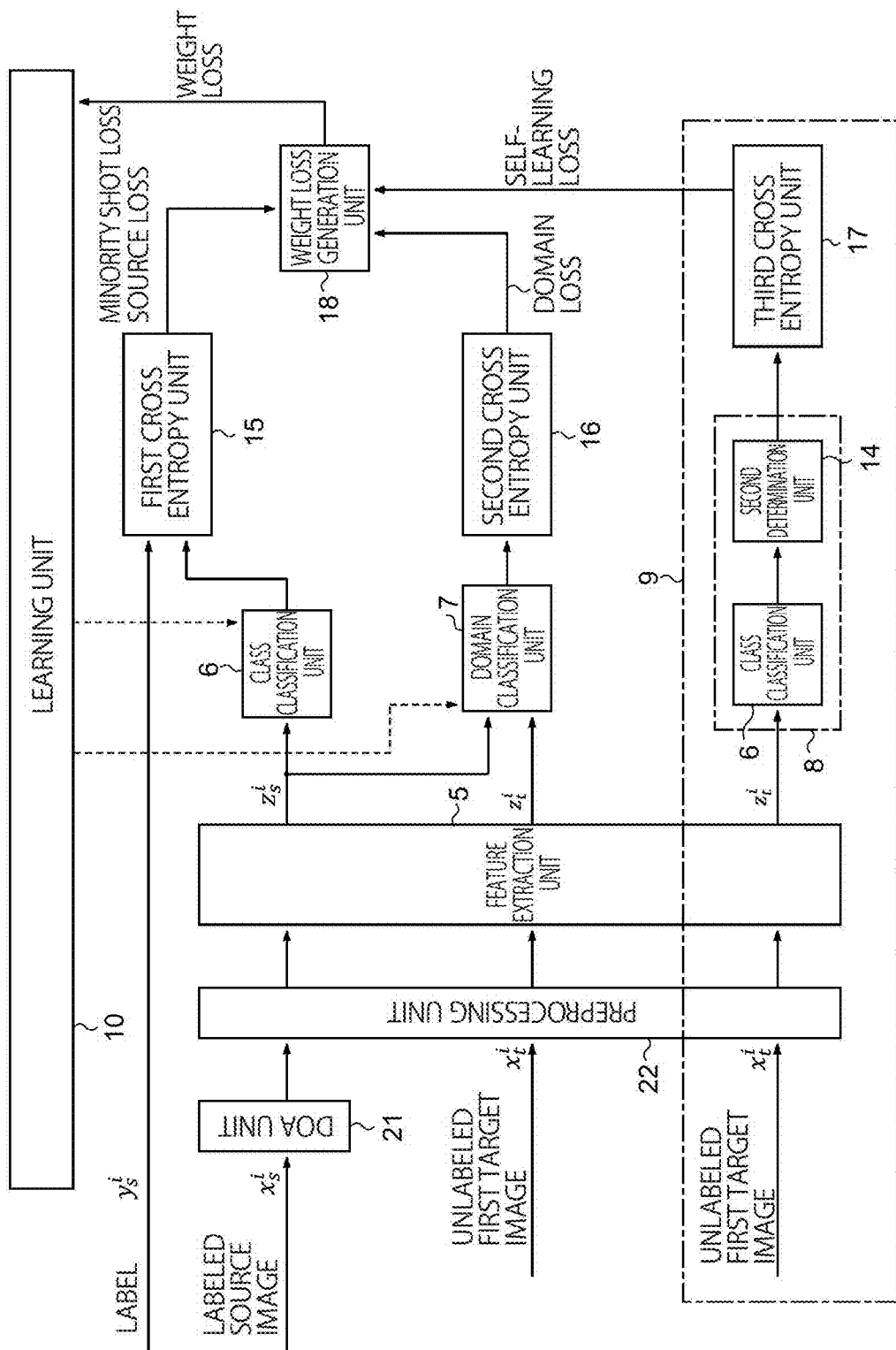
FIG. 24 is a block diagram illustrating a schematic configuration of an image processing apparatus according to a second modification of the third embodiment.

FIG. 24 is a block diagram illustrating a schematic configuration of an image processing apparatus 1d according to the second modification of the third embodiment. An image processing apparatus 1d in FIG. 24 includes a data oversampling augmentation (DOA) unit 21 and a preprocessing unit 22 in addition to the configuration in FIG. 22. The DOA unit 21 increases the number of source images for a class with a small number of images in order to eliminate the variation in the number of source images between classes. When the number of source images is increased, for example, a new source image is generated by rotating an existing source image by a predetermined angle.

By providing the DOA unit 21, source images having no variation in the number of images between classes are input to the feature extraction unit 5. Therefore, when the class classification unit 6 performs the class classification of the source image, the variation in the number of source images between the classes does not occur, and the learning effect for each class can be made uniform.

The preprocessing unit 22 performs a preprocess on the source image increased by the DOA unit 21 and the unlabeled first target image. The preprocess includes filtering to remove unwanted images, such as noisy images. Each image preprocessed by the preprocessing unit 22 is input to the feature extraction unit 5.

Figure 25A:
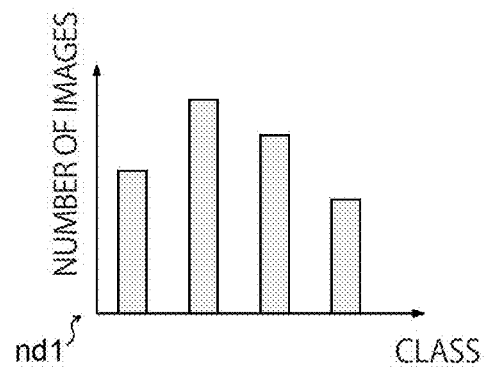
FIG. 25A is a diagram illustrating a distribution of the number of a plurality of source images for each class in a certain mini-batch.

FIG. 25A is a diagram illustrating a distribution nd1 of the number of a plurality of source images for each class in a certain mini-batch input to the image processing apparatus 1d. As illustrated in FIG. 25A, the plurality of source images is classified into a plurality of classes, and the number of source images of each class is not necessarily the same, and the number varies depending on the class.

Figure 25B:
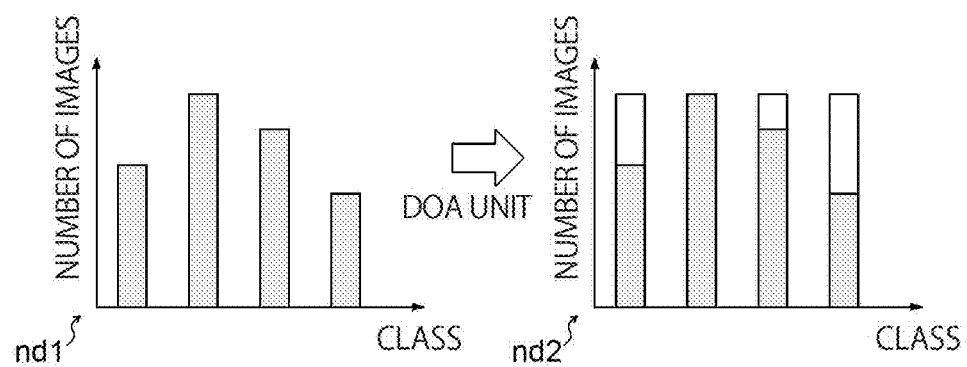
FIG. 25B is a diagram illustrating processing of a DOA unit.

FIG. 25B is a diagram illustrating processing by the DOA unit 21. The DOA unit 21 increases the number of source images for a class with a small number of source images such that the number of source images belonging to each class is the same (distribution nd2 of the number of images for each class). As a result, the number of the source images output from the DOA unit 21 has no variation between classes.

Figure 26A:
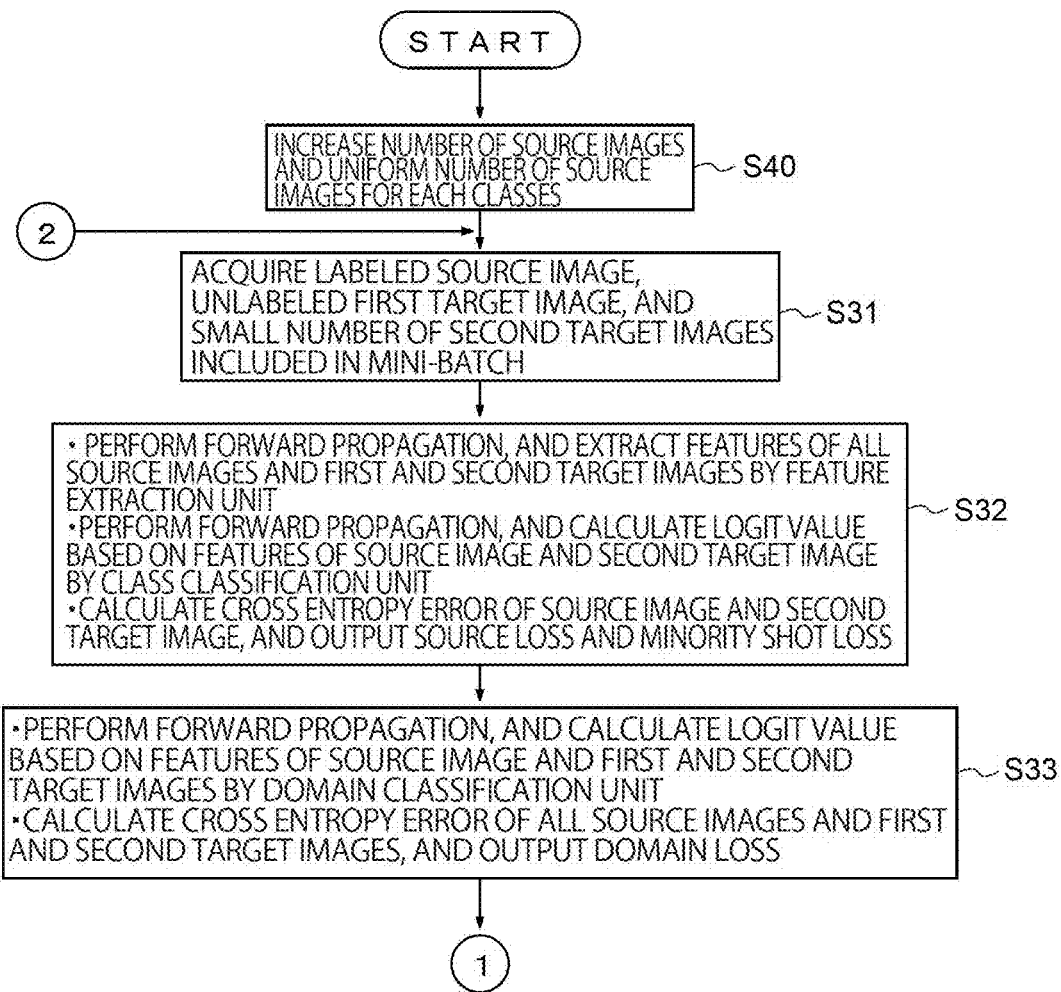
FIG. 26A is a flowchart illustrating a processing operation of the image processing apparatus according to the second modification of the third embodiment.
Figure 26B:
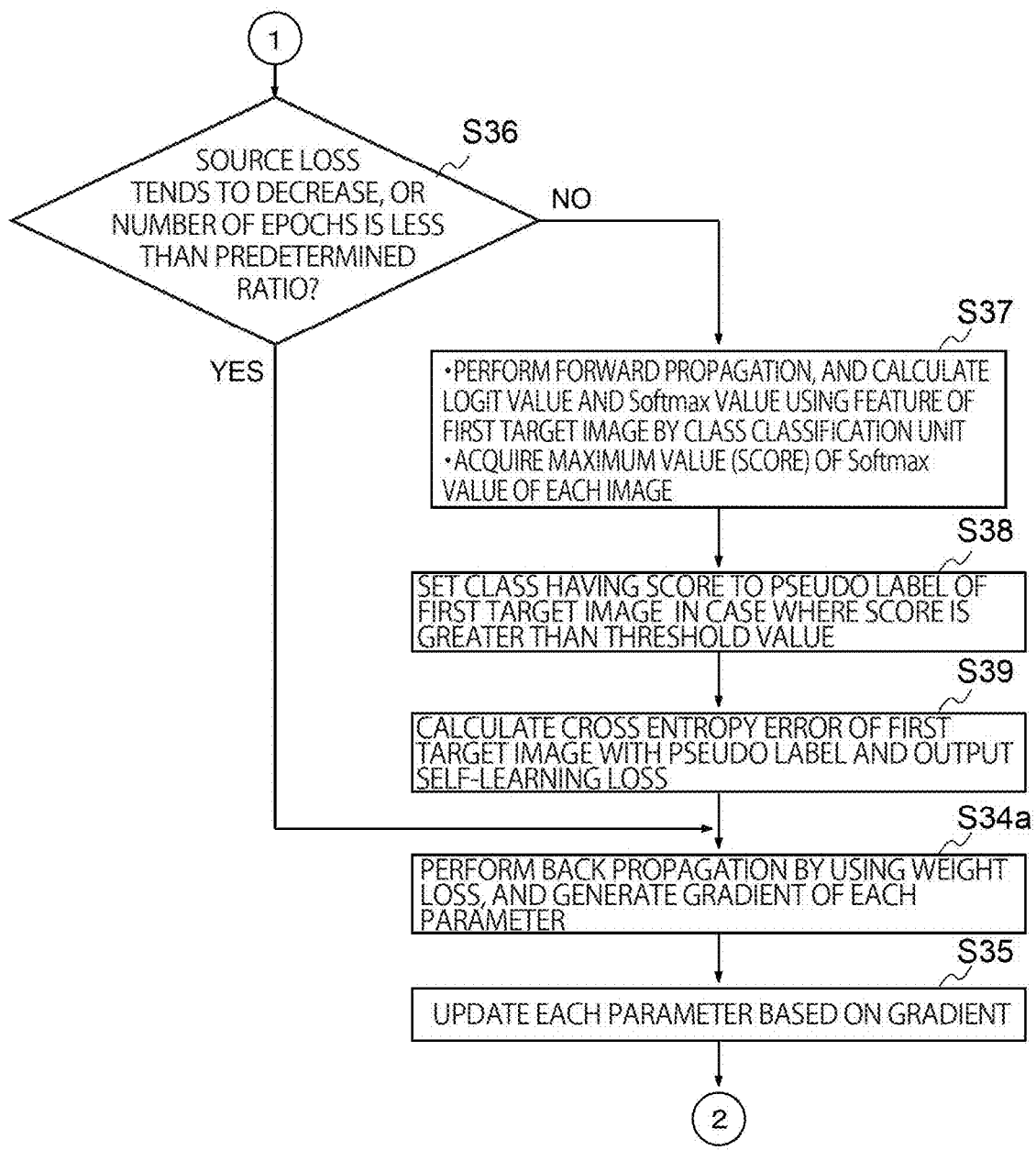
FIG. 26B is a flowchart following FIG. 26A.

FIG. 26 is a flowchart illustrating a processing operation of the image processing apparatus 1d according to the second modification of the third embodiment. The flowchart of FIG. 26 is obtained by adding S40 to the flowchart of FIG. 23. In S40, before the process of S31 is started, the DOA unit 21 performs a process (augmentation process) of increasing the number of source images so that the number of source images for each class is equal. Thereafter, as in FIG. 23, the processes in and after S31 are started.

As described above, in the second modification of the third embodiment, since the number of source images is increased so that the number of source images input to the feature extraction unit 5 for each class is equal, there is no variation in the accuracy of pseudo label assignment between classes.

Third Modification of Third Embodiment

A third modification of the third embodiment not only increases the number of source images but also increases the number of labeled second target images.

Figure 27:
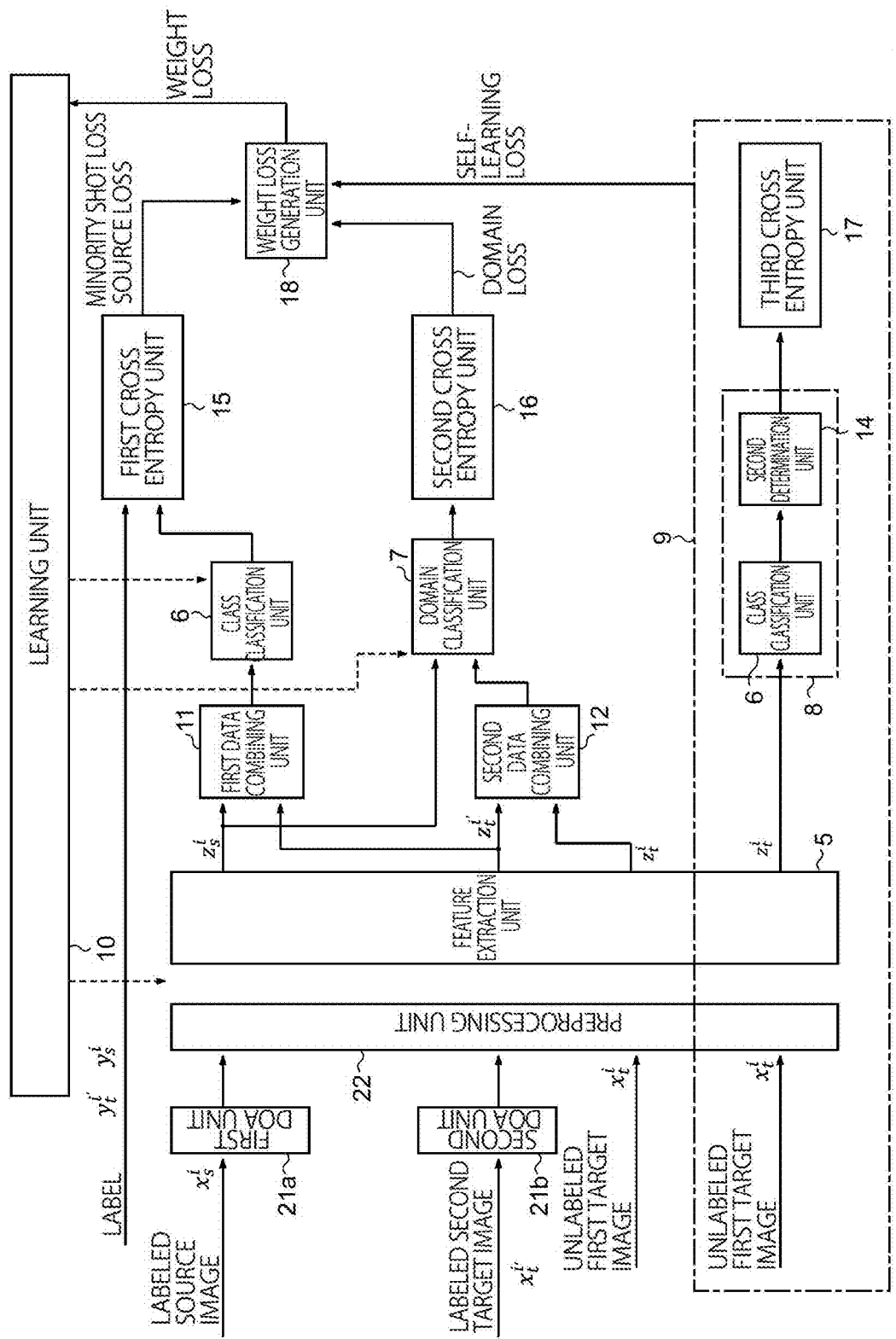
FIG. 27 is a block diagram illustrating a schematic configuration of an image processing apparatus according to a third modification of the third embodiment.

FIG. 27 is a block diagram illustrating a schematic configuration of an image processing apparatus 1e according to the third modification of the third embodiment. The image processing apparatus 1e of FIG. 27 includes a first DOA unit 21a, a second DOA unit 21b, and the preprocessing unit 22 in addition to the configuration of FIG. 22.

The first DOA unit 21a is the same as the DOA unit 21 in FIG. 24, and increases the number of source images so that the number of source images is equal between classes. The second DOA unit 21b increases the number of second target images so that the number of labeled second target images is equal between classes.

The preprocessing unit 22 performs a preprocess on the source image increased by the first DOA unit 21a, the labeled second target image increased by the second DOA unit 21b, and the unlabeled first target image. Each image preprocessed by the preprocessing unit 22 is input to the feature extraction unit 5.

Figure 28A:
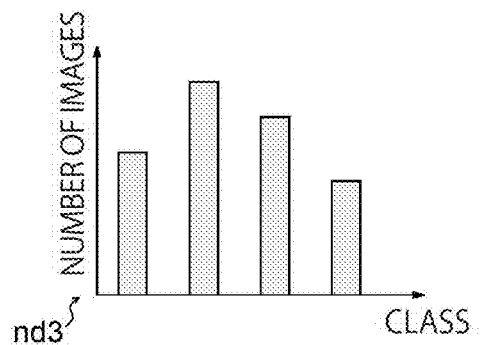
FIG. 28A is a diagram illustrating a distribution of the number of the source images or the first target images for each class.
Figure 28B:
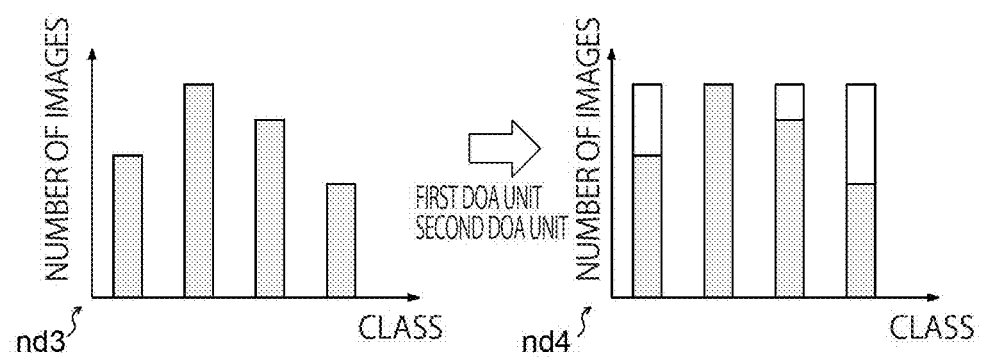
FIG. 28B is a diagram illustrating processing operations of a first DOA unit and a second DOA unit.

FIG. 28A is a diagram illustrating a distribution nd3 of the number of the source images before input to the first DOA unit 21a or the first target images before input to the second DOA unit 21b for each class. FIG. 28B is a diagram illustrating processing operations of the first DOA unit 21a and the second DOA unit 21b. As illustrated in FIG. 28B, both the first DOA unit 21a and the second DOA unit 21b increase the number of images so that the number of images for each class is equal (distribution nd4 of the number of images for each class).

Figure 29A:
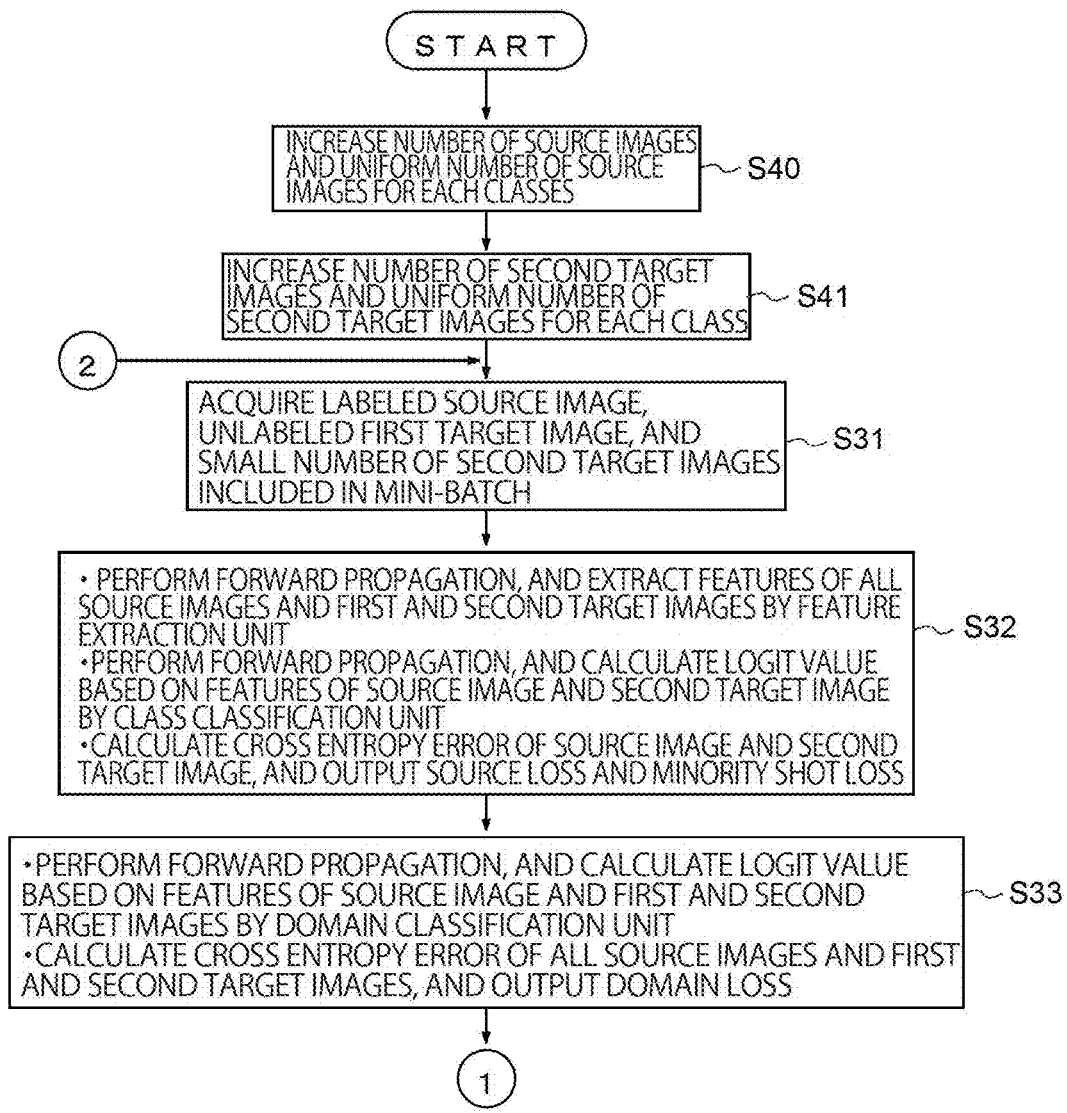
FIG. 29A is a flowchart illustrating a processing operation of the image processing apparatus according to the third modification of the third embodiment.
Figure 29B:
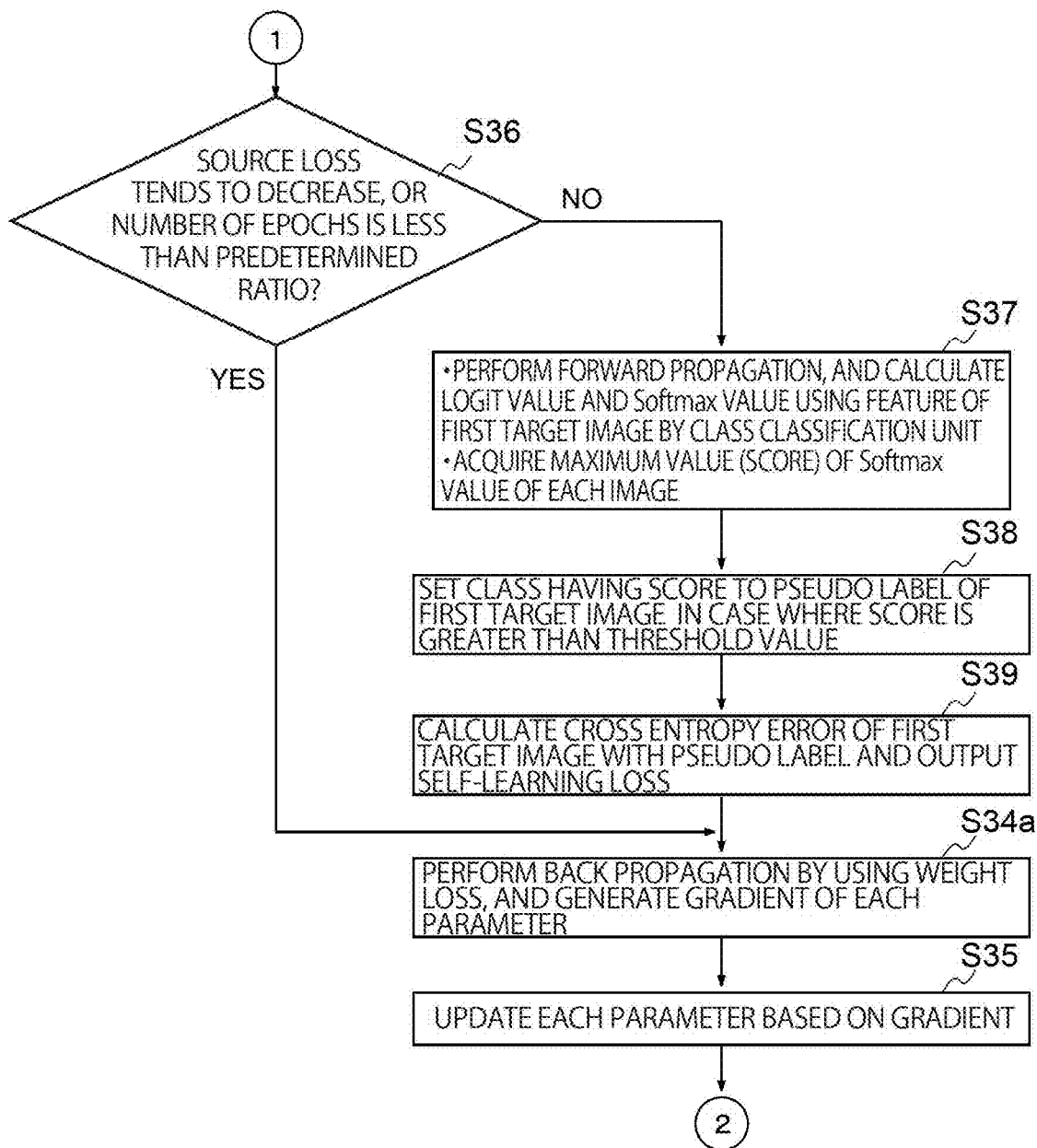
FIG. 29B is a flowchart following FIG. 29A.

FIG. 29 is a flowchart illustrating a processing operation of an image processing apparatus 1f according to the third modification of the third embodiment. The flowchart of FIG. 29 is obtained by adding S41 to the flowchart of FIG. 26. S40 in FIG. 29 is executed by the first DOA unit 21a instead of the DOA unit 21 in FIG. 24.

In S41, before the process of S31 is started, the second DOA unit 21b performs a process (augmentation process) of increasing the number of second target images so that the number of labeled second target images for each class is equal. The total number of the second target images is made equal to the total number of the source images. Thereafter, the processes in and after S31 are started.

As described above, in the third modification of the third embodiment, since not only the number of source images but also the number of the labeled second target images are increased, it is possible to further suppress the variation in accuracy of the pseudo label for each class.

Fourth Embodiment

A fourth embodiment describes an inference process performed after the learning of the first to third neural networks 5n, 6n, and 7n is completed in the image processing apparatuses 1, 1a, 1b, 1c, 1d, 1e, and 1f according to the first to third embodiments described above.

Figure 30:
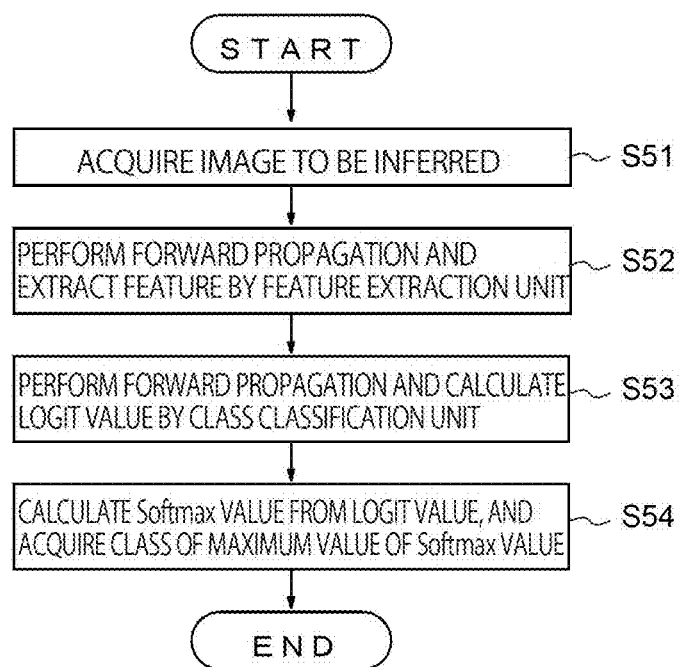
FIG. 30 is a flowchart illustrating a processing operation of an inference processing.

FIG. 30 is a flowchart illustrating a processing operation of the inference process. FIG. 30 illustrates the processing operation of the class classification unit 6 when the first target image is input. First, at least one image to be inferred captured by a imaging device is acquired (S51). The image acquired in S51 is the first target image. Next, the acquired first target image is input to the feature extraction unit 5, and the forward propagation process is performed to extract the feature (S52).

Next, the extracted feature is input to the class classification unit 6, the forward propagation process is performed to calculate a logit value of each first target image for each class (S53). Next, the class classification unit 6 calculates the Softmax value from the logit value, acquires the class having the largest Softmax value, and calculates the Softmax value of the first target image (S54). A class having the largest Softmax value is assigned as a pseudo label.

Figure 31:
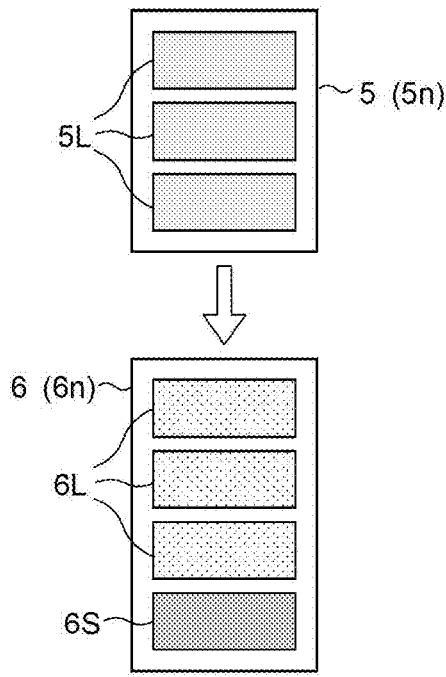
FIG. 31 is a diagram illustrating a layer configuration of a first neural network and a layer configuration of a second neural network.

FIG. 31 is a diagram schematically illustrating a layer configuration of the first neural network 5n used when the feature extraction unit 5 extracts the feature of the first target image and a layer configuration of the second neural network 6n used when the class classification unit 6 performs the class classification of the first target image, and is the same as that illustrated in FIG. 4.

As described above, the first to third neural networks 5n, 6n, and 7n learned by the image processing apparatuses 1, 1a, 1b, 1c, 1d, 1e, and 1f according to the first to third embodiments can be used for the class classification of the first target image, whereby an appropriate pseudo label can be assigned to the first target image.

At least part of the image processing apparatuses 1, 1a, 1b, 1c, 1d, 1e, and 1f described in the first to third embodiments may be configured by hardware or software. In the case of being configured by software, a program for realizing at least some of the functions of the image processing apparatus 1, 1a, 1b, 1c, 1d, 1e, and 1f may be stored in a recording medium such as a flexible disk or a CD-ROM, and may be read and executed by a computer. The recording medium is not limited to a removable recording medium such as a magnetic disk or an optical disk, and may be a fixed recording medium such as a hard disk device or a memory.

In addition, a program that implements at least some of the functions of the image processing apparatuses 1, 1a, 1b, 1c, 1d, 1e, and 1f may be distributed via a communication line (including wireless communication) such as the Internet. Further, the program may be distributed via a wired line or a radio line such as the Internet or stored in a recording medium in an encrypted, modulated, or compressed state.

Figure 32:
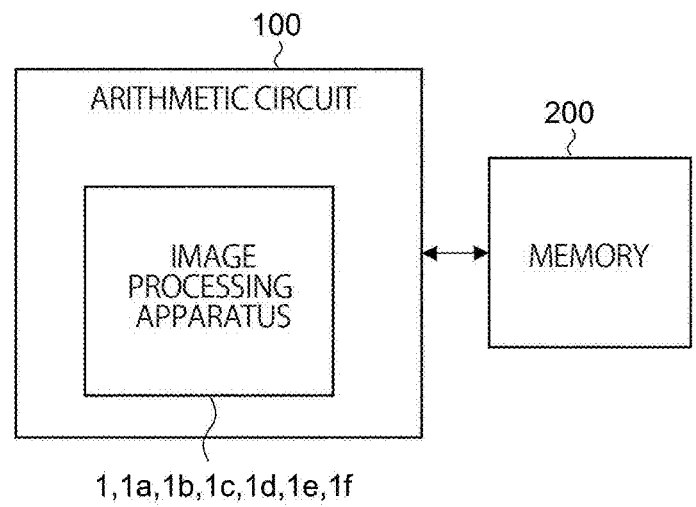
FIG. 32 is a block diagram illustrating a hardware configuration that performs a processing operation of the image processing apparatus according to each of the first to third embodiments.

FIG. 32 is a block diagram illustrating a hardware configuration for performing the processing operations of the image processing apparatuses 1, 1a, 1b, 1c, 1d, 1e, and 1f according to the first to third embodiments. The image processing apparatuses 1, 1a, 1b, 1c, 1d, 1e, and 1f in FIG. 32 are implemented by an arithmetic circuit 100. The arithmetic circuit 100 performs the processing operations of the first image acquisition unit 2, the second image acquisition unit 3, the label acquisition unit 4, the feature extraction unit 5, the class classification unit 6, the domain classification unit 7, the self-learning unit 9 including the processing unit 8, the learning unit 10, the first data combining unit 11, the second data combining unit 12, the first determination unit 13, the second determination unit 14, the first cross entropy unit 15, the second cross entropy unit 16, the third cross entropy unit 17, and the weight loss generation unit 18 illustrated in FIG. 1. The arithmetic circuit 100 may be a computer device such as a general-purpose personal computer (PC) or a server, or may be a semiconductor chip such as a central processing unit (CPU), a signal processing processor, or a graphic processing unit (GPU).

The memory 200 stores a program executed by the arithmetic circuit 100, data used for arithmetic processing by the arithmetic circuit 100, and the like. Specifically, the layer configuration, the weight coefficient, the input data, the output data, and the like of the first to third neural networks 5n, 6n, and 7n are stored in the memory 200. Various programs and data stored in the memory 200 are read by the arithmetic circuit 100 as necessary, and an arithmetic result by the arithmetic circuit 100 is stored in the memory 200 as necessary. The memory 200 may be a stationary storage device such as a hard disk device or an optical disk device, or may be a semiconductor storage device such as a volatile memory or a nonvolatile memory.

While certain embodiments have been described, these embodiments have been presented by way of example only, and are not intended to limit the scope of the disclosures.

Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. An image processing apparatus comprising:
 a first image acquisitor configured to acquire a source image to which a label is assigned;
 a second image acquisitor configured to acquire a first target image to which no label is assigned;
 a label acquisitor configured to acquire a label;
 a feature extractor including a first neural network configured to extract a feature of the source image and a feature of the first target image;
 a class classifier including a second neural network configured to perform a class classification of the source image and the first target image based on a plurality of the features extracted by the feature extractor;
 a domain classifier including a third neural network configured to perform a domain classification of the source image and the first target image based on the feature extracted by the feature extractor;
 a processor configured to assign a pseudo label to the first target image using the class classifier including the second neural network in a middle of learning;
 a self-learner configured to perform a self-learning of the first neural network, the second neural network, and the third neural network based on a feature obtained by inputting the first target image to which the pseudo label is assigned to the feature extractor; and
 a learner configured to learn the first neural network, the second neural network, and the third neural network by performing a back propagation process based on a classification result by the class classifier, a classification result by the domain classifier, and a self-learning result by the self-learner.

2. The image processing apparatus according to claim 1, further comprising:
 a first loss calculator configured to calculate a first loss representing reliability of the class classification of the source image by the class classifier;
 a second loss calculator configured to calculate a second loss representing reliability of the domain classification of the source image and the first target image by the domain classifier; and
 a third loss calculator configured to calculate a third loss representing reliability of the class classification of the first target image to which the pseudo label is assigned, wherein
 the self-learner is configured to input the first target image to which the pseudo label is assigned to the feature extractor and is configured to cause the third loss calculator to calculate the third loss, and
 the learner is configured to learn the first neural network, the second neural network, and the third neural network by performing the back propagation process based on the first loss, the second loss, and the third loss.

3. The image processing apparatus according to claim 1, further comprising:
 a first loss calculator configured to calculate a first loss representing reliability of the class classification of the source image by the class classifier;
 a second loss calculator configured to calculate a second loss representing reliability of the domain classification of the source image and the first target image by the domain classifier; and
 a third loss calculator configured to calculate a third loss representing reliability of the class classification of the first target image by the class classifier, wherein
 the self-learner is configured to input the first target image to which the pseudo label is assigned to the feature extractor and is configured to cause the third loss calculator to calculate the third loss, and
 the learner comprises a first learner configured to perform the back propagation process based on the first loss and the second loss to learn the first neural network, the second neural network, and the third neural network, and a second learner configured to perform the back propagation process based on the third loss to learn the first neural network and the second neural network.

4. The image processing apparatus according to claim 2, wherein
 the self-learner is configured to stop the self-learning when the second loss is equal to or greater than a threshold value after starting the self-learning.

5. The image processing apparatus according to claim 2, further comprising:
 a weight loss generator configured to adjust weights of the first loss, the second loss, and the third loss when the back propagation process is performed to generate a weight loss, wherein
 the learner is further configured to perform the back propagation process based on the weight loss to learn the first neural network, the second neural network, and the third neural network.

6. The image processing apparatus according to claim 5, wherein
 the weight loss generator is configured to generate the weight loss by lowering weights of the first loss and the second loss and raising a weight of the third loss as the self-learning by the self-learner progresses.

7. The image processing apparatus according to claim 2, wherein
 with an image group including a plurality of the source images and a plurality of the first target images being set as one epoch, the class classifier and the domain classifier are configured to perform class classification and domain classification for a plurality of epochs, and
 the self-learner is configured to start labeling the first target image and the self-learning in a case where the first loss is equal to or less than a threshold value or in a case where the number of the processed epochs exceeds a predetermined ratio with respect to a total number of the epochs.

8. The image processing apparatus according to claim 1, further comprising:
 a third image acquisitor configured to acquire a second target image to which a label is assigned, the number of the second target images being smaller than the number of the first target images, wherein
 the feature extractor is configured to extract a feature of the second target image,
 the class classifier is configured to perform the class classification of the second target image based on the feature of the second target image extracted by the feature extractor, the domain classifier is configured to perform the domain classification of the second target image based on the feature of the second target image extracted by the feature extractor, and the learner is configured to learn the first neural network, the second neural network, and the third neural network based on classification results of classes and domains of the source image, the first target image, and the second target image.

9. The image processing apparatus according to claim 8, further comprising:

a padder configured to increase the number of the second target images so that the number of the second target images acquired by the third image acquisitor is equal between classes.

10. The image processing apparatus according to claim 1, wherein the self-learner is configured to perform the self-learning by inputting, to the feature extractor, the first target image, as teacher data, in which a certainty factor of the pseudo label is equal to or greater than a threshold value among the first target images to each of which the pseudo label is assigned by the class classifier.

11. The image processing apparatus according to claim 1, wherein the class classifier and the domain classifier are configured to perform class classification and domain classification for each image group including a plurality of the source images and a plurality of the first target images, and the self-learner is configured to determine whether to assign the pseudo label to the first target image every time one of the first target images in the image group is input to the second image acquisitor, and is configured to perform the self-learning based on the first target image to which the pseudo label is assigned.

12. The image processing apparatus according to claim 1, wherein the class classifier and the domain classifier are configured to perform class classification and domain classification for each image group including a plurality of the source images and a plurality of the first target images, and the self-learner is configured to assign, without referring to a pseudo label assigned to the first target image in the one image group, a pseudo label to the first target image in the another image group.

13. The image processing apparatus according to claim 1, wherein the class classifier is configured to output a Softmax value obtained by quantifying a certainty factor with which the first target image is classified into each of a plurality of classes, and in a case where a maximum value of the Softmax value exceeds a threshold value, the self-learner is configured to assign the pseudo label associated with a class having the maximum value.

14. The image processing apparatus according to claim 1, wherein the class classifier is configured to output a Softmax value obtained by quantifying a certainty factor with which the first target image is classified into each of a plurality of classes, and in a case where a maximum value of the Softmax value is equal to or less than a threshold value, the self-learner is configured to perform the self-learning by masking a value related to the maximum value of the Softmax value.

15. The image processing apparatus according to claim 1, wherein the class classifier is configured to output a Softmax value obtained by quantifying a certainty factor with which the first target image is classified into each of a plurality of classes, and in a case where a maximum value of the Softmax value is equal to or less than a threshold value, the self-learner is configured to perform the self-learning by masking values related to all the Softmax values associated with the plurality of classes each having the Softmax value.

16. The image processing apparatus according to claim 1, wherein the class classifier and the domain classifier are configured to perform class classification and domain classification for each image group including a plurality of the source images and a plurality of the first target images, and the self-learner is configured to adjust, among a plurality of the first target images included in the image group, the number of first target images, for each class, to each of which the pseudo label is assigned.

17. An image processing apparatus comprising:

a first image acquisitor configured to acquire a source image to which a label is assigned;

a second image acquisitor configured to acquire a first target image to which no label is assigned;

a third image acquisitor configured to acquire a second target image to which a label is assigned, the number of the second target images being smaller than the number of the first target images;

a label acquisitor configured to acquire a label;

a feature extractor including a first neural network configured to extract a feature of the source image, a feature of the first target image, and a feature of the second target image;

a class classifier including a second neural network configured to perform class classification of the source image and the second target image based on a plurality of the features extracted by the feature extractor;

a domain classifier including a third neural network configured to perform domain classification of the source image, the first target image, and the second target image; and a learner configured to learn the first neural network, the second neural network, and the third neural network by performing a back propagation process based on a classification result by the class classifier and a classification result by the domain classifier.

18. The image processing apparatus according to claim 17, further comprising:

a first loss calculator configured to calculate a first loss representing reliability of the class classification of the source image and the second target image by the class classifier; and a second loss calculator configured to calculate a second loss representing reliability of the domain classification of the source image, the first target image, and the second target image by the domain classifier, wherein the learner is configured to learn the first neural network, the second neural network, and the third neural network by performing a back propagation process based on the first loss and the second loss.

19. The image processing apparatus according to claim 18, further comprising:
a processor configured to assign a pseudo label to the first target image using the class classifier including the second neural network in a middle of learning; and
a self-learner configured to perform self-learning of the first neural network, the second neural network, and the third neural network by inputting the first target image to which the pseudo label is assigned to the feature extractor.

20. The image processing apparatus according to claim 19, further comprising:
a third loss calculator configured to calculate a third loss representing reliability of the class classification of the first target image by the class classifier, wherein
the self-learner is configured to input the first target image to which the pseudo label is assigned to the feature extractor and is configured to cause the third loss calculator to calculate the third loss, and
the learner is configured to learn the first neural network, the second neural network, and the third neural network by performing a back propagation process based on the first loss, the second loss, and the third loss.

* * * * *